US012513755B2

(12) United States Patent
Fields et al.

(10) Patent No.: US 12,513,755 B2
(45) Date of Patent: Dec. 30, 2025

(54) SYSTEM AND METHOD FOR MONITORING AND MINIMIZING VEHICLE CARBON EMISSIONS

(71) Applicant: Platform Science, Inc., San Diego, CA (US)

(72) Inventors: Jacob Fields, Ocean Ridge, FL (US); Brendan Wood, San Diego, CA (US); Matt Garofalo, San Diego, CA (US); Kristen Jourdonais, San Diego, CA (US); Samuel Harrell, EL Cajon, CA (US); Mitch Vesco, San Diego, CA (US); Natalia Burgett, San Diego, CA (US); Rebekah Gebhardt, San Diego, CA (US)

(73) Assignee: Platform Science, Inc., San Diego, CA (US)

( * ) Notice: Subject to any disclaimer, the term of this patent is extended or adjusted under 35 U.S.C. 154(b) by 496 days.

(21) Appl. No.: 18/136,666

(22) Filed: Apr. 19, 2023

(65) Prior Publication Data
US 2023/0254911 A1     Aug. 10, 2023

Related U.S. Application Data

(63) Continuation-in-part of application No. 17/536,066, filed on Nov. 28, 2021, now Pat. No. 11,641,677,
(Continued)

(51) Int. Cl.
*H04W 76/10* (2018.01)
*H04L 67/12* (2022.01)
(Continued)

(52) U.S. Cl.
CPC ............. *H04W 76/10* (2018.02); *H04L 67/12* (2013.01); *H04W 4/40* (2018.02); *H04W 76/19* (2018.02); *H04W 84/005* (2013.01); *H04W 84/12* (2013.01)

(58) Field of Classification Search
CPC ....... H04W 76/10; H04W 4/40; H04W 76/19; H04W 84/005; H04W 84/12;
(Continued)

(56) References Cited

U.S. PATENT DOCUMENTS

| 5,579,233 A | 11/1996 | Burns |
| 5,954,773 A | 9/1999 | Luper |

(Continued)

FOREIGN PATENT DOCUMENTS

| CN | 108462673 A | 8/2018 |
| CN | 109714420 A | 5/2019 |

(Continued)

OTHER PUBLICATIONS

International Search Report for PCT Application PCT/US2017/037825, mailed on Sep. 21, 2017.
(Continued)

*Primary Examiner* — Kyaw Z Soe
(74) *Attorney, Agent, or Firm* — Clause Eight; Michael Catania

(57) ABSTRACT

A system (1100) and method (810) for monitoring and minimizing vehicle carbon emissions is disclosed herein. The system (1100) comprises a mobile device (110) for a vehicle (1000), a connected vehicle device (135) comprising on-vehicle data for the vehicle (1000), and an off vehicle source (70) selected from a database (1125), a cloud source (1175), or a physical structure (1140). The mobile device (110) is configured to access and combine off-vehicle content (75) with on-vehicle data relating to carbon emissions,
(Continued)

in order to enable, disable or manage at least one function of the vehicle (1000) over a secure wireless network (80).

19 Claims, 21 Drawing Sheets

Related U.S. Application Data which is a continuation of application No. 16/912,265, filed on Jun. 25, 2020, now Pat. No. 11,197,329, which is a continuation-in-part of application No. 16/870,955, filed on May 9, 2020, now Pat. No. 11,330,644, and a continuation-in-part of application No. 16/664,906, filed on Oct. 27, 2019, now Pat. No. 10,803,682, said application No. 16/870,955 is a continuation-in-part of application No. 16/416,396, filed on May 20, 2019, now Pat. No. 10,652,935, which is a continuation-in-part of application No. 16/118,436, filed on Aug. 31, 2018, now Pat. No. 10,334,638, which is a continuation of application No. 15/917,633, filed on Mar. 11, 2018, now Pat. No. 10,070,471, said application No. 16/664,906 is a continuation of application No. 15/859,380, filed on Dec. 30, 2017, now Pat. No. 10,475,258, said application No. 15/917,633 is a continuation of application No. 15/624,814, filed on Jun. 16, 2017, now Pat. No. 9,961,710, said application No. 15/859,380 is a continuation-in-part of application No. 15/624,814, filed on Jun. 16, 2017, now Pat. No. 9,961,710.

(60) Provisional application No. 63/334,051, filed on Apr. 22, 2022, provisional application No. 62/867,845, filed on Jun. 27, 2019, provisional application No. 62/441,298, filed on Dec. 31, 2016, provisional application No. 62/441,290, filed on Dec. 31, 2016, provisional application No. 62/352,014, filed on Jun. 19, 2016.

(51) Int. Cl.
*H04W 4/40* (2018.01)
*H04W 76/19* (2018.01)
*H04W 84/00* (2009.01)
*H04W 84/12* (2009.01)

(58) Field of Classification Search
CPC ........ H04W 4/024; H04W 4/44; H04L 67/12; H04L 67/52; H04L 67/125; H04L 67/02; H04L 67/06; G01C 21/3453
See application file for complete search history.

(56) References Cited

U.S. PATENT DOCUMENTS

| | | | |
|---|---|---|---|
| 5,995,898 | A | 11/1999 | Tuttle |
| 6,292,724 | B1 | 9/2001 | Apsell et al. |
| 6,526,341 | B1 | 2/2003 | Bird et al. |
| 6,611,686 | B1 | 8/2003 | Smith et al. |
| 6,651,001 | B2 | 11/2003 | Apsell |
| 6,735,150 | B2 | 5/2004 | Rothman |
| 6,925,308 | B2 | 8/2005 | Goldsmith et al. |
| 7,043,365 | B2 | 5/2006 | Inbar et al. |
| 7,079,230 | B1 | 7/2006 | McInerney et al. |
| 7,092,803 | B2 | 8/2006 | Kapolka et al. |
| 7,327,250 | B2 | 2/2008 | Harvey |
| 7,350,707 | B2 | 4/2008 | Barkan |
| 7,555,378 | B2 | 6/2009 | Larschan et al. |
| 7,616,105 | B2 | 11/2009 | Macielinski et al. |
| 7,725,216 | B2 | 5/2010 | Kim |
| 8,626,144 | B2 | 1/2014 | Talty et al. |
| 8,626,568 | B2 | 1/2014 | Warkentin et al. |
| 8,789,161 | B2 | 7/2014 | Jeal |
| 8,855,626 | B2 | 10/2014 | O'Toole et al. |
| 9,032,493 | B2 | 5/2015 | Lortz et al. |
| 9,064,422 | B2 | 6/2015 | Mohn et al. |
| 9,147,335 | B2 | 9/2015 | Raghunathan et al. |
| 9,215,590 | B2 | 12/2015 | Bondesen et al. |
| 9,256,992 | B2 | 2/2016 | Davidson |
| 9,262,934 | B2 | 2/2016 | Mohn et al. |
| 9,275,010 | B2 | 3/2016 | Kote et al. |
| 9,376,090 | B2 | 6/2016 | Gennermann |
| 9,390,628 | B2 | 7/2016 | Mohn et al. |
| 9,424,751 | B2 | 8/2016 | Hodges et al. |
| 9,445,447 | B2 | 9/2016 | Pal et al. |
| 9,544,768 | B2 | 1/2017 | Steffey et al. |
| 9,578,668 | B2 | 2/2017 | Sim |
| 9,595,018 | B2 | 3/2017 | Carvajal |
| 9,632,506 | B2 | 4/2017 | Wellman et al. |
| 9,671,241 | B2 | 6/2017 | Tang |
| 9,754,425 | B1 | 9/2017 | Iqbal et al. |
| 9,961,710 | B2 | 5/2018 | Son et al. |
| 10,070,471 | B2 | 9/2018 | Son et al. |
| 10,074,220 | B2 | 9/2018 | Cawse et al. |
| 10,255,575 | B2 | 4/2019 | Warkentin et al. |
| 10,255,606 | B2 | 4/2019 | Harter et al. |
| 10,334,638 | B2 | 6/2019 | Son et al. |
| 10,475,258 | B1 | 11/2019 | Son et al. |
| 10,652,935 | B1 | 5/2020 | Son et al. |
| 10,803,682 | B1 | 10/2020 | Son et al. |
| 10,829,063 | B1 | 11/2020 | Konrardy et al. |
| 10,917,921 | B2 | 2/2021 | Kennedy et al. |
| 10,930,091 | B1 | 2/2021 | Son et al. |
| 11,197,329 | B2 | 12/2021 | Kennedy et al. |
| 11,197,330 | B2 | 12/2021 | Kennedy et al. |
| 11,330,644 | B2 | 5/2022 | Kopchinsky et al. |
| 11,419,163 | B2 | 8/2022 | Kennedy et al. |
| 11,430,270 | B1 | 8/2022 | Son et al. |
| 11,438,938 | B1 | 9/2022 | Kennedy et al. |
| 11,503,655 | B2 | 11/2022 | Kennedy et al. |
| 11,528,759 | B1 | 12/2022 | Kennedy et al. |
| 11,691,632 | B1* | 7/2023 | Chen ................... B60W 40/09 701/22 |
| 11,734,783 | B2* | 8/2023 | Misra .................. G06V 20/582 |
| 2008/0039983 | A1 | 2/2008 | Oesterling et al. |
| 2008/0137860 | A1 | 6/2008 | Silvernail |
| 2009/0099724 | A1 | 4/2009 | Kranz et al. |
| 2009/0276115 | A1 | 11/2009 | Chen |
| 2010/0279733 | A1 | 11/2010 | Karsten et al. |
| 2011/0080256 | A1 | 4/2011 | Mehalschick, Sr. |
| 2012/0030467 | A1 | 2/2012 | Schaefer |
| 2012/0161927 | A1 | 6/2012 | Pierfelice et al. |
| 2012/0254960 | A1 | 10/2012 | Lortz et al. |
| 2012/0262283 | A1 | 10/2012 | Biondo et al. |
| 2012/0323690 | A1 | 12/2012 | Michael |
| 2013/0006715 | A1 | 1/2013 | Warkentin et al. |
| 2013/0017816 | A1 | 1/2013 | Talty et al. |
| 2013/0046846 | A1 | 2/2013 | Mason et al. |
| 2013/0110296 | A1 | 5/2013 | Khoo et al. |
| 2013/0304276 | A1 | 11/2013 | Flies |
| 2014/0122187 | A1 | 5/2014 | Warkentin et al. |
| 2014/0162598 | A1 | 6/2014 | Villa-Real |
| 2014/0213176 | A1 | 7/2014 | Mendelson |
| 2014/0223235 | A1 | 8/2014 | Gundlapalli et al. |
| 2014/0232569 | A1 | 8/2014 | Skinder et al. |
| 2014/0309891 | A1 | 10/2014 | Ricci |
| 2014/0309892 | A1 | 10/2014 | Ricci |
| 2014/0338644 | A1* | 11/2014 | MacNeille ............. F02M 26/46 701/115 |
| 2015/0099500 | A1 | 4/2015 | Chalmers |
| 2015/0120135 | A1 | 4/2015 | Lawrenson |
| 2015/0147974 | A1 | 5/2015 | Tucker et al. |
| 2015/0215986 | A1 | 7/2015 | Lei et al. |
| 2015/0339334 | A1 | 11/2015 | Hanke |
| 2015/0365979 | A1 | 12/2015 | Park |
| 2016/0009304 | A1 | 1/2016 | Kumar et al. |
| 2016/0011001 | A1 | 1/2016 | Emory et al. |
| 2016/0066127 | A1 | 3/2016 | Choi et al. |
| 2016/0084657 | A1 | 3/2016 | Schilling et al. |
| 2016/0150588 | A1 | 5/2016 | Yae |

(56) References Cited

U.S. PATENT DOCUMENTS

| | | | |
|---|---|---|---|
| 2016/0247153 A1 | 8/2016 | Leseky | |
| 2016/0277923 A1 | 9/2016 | Steffey et al. | |
| 2016/0334236 A1 | 11/2016 | Mason et al. | |
| 2016/0343255 A1 | 11/2016 | Warren | |
| 2017/0011561 A1 | 1/2017 | Makke et al. | |
| 2017/0017927 A1 | 1/2017 | Domnick et al. | |
| 2017/0104728 A1 | 4/2017 | Girard et al. | |
| 2017/0178035 A1 | 6/2017 | Grimm et al. | |
| 2017/0367142 A1 | 12/2017 | Son et al. | |
| 2018/0018664 A1 | 1/2018 | Purves et al. | |
| 2018/0075399 A1* | 3/2018 | Agarwal | G01F 23/804 |
| 2018/0285832 A1 | 10/2018 | Oz et al. | |
| 2018/0376522 A1 | 12/2018 | Son et al. | |
| 2019/0066041 A1 | 2/2019 | Hance et al. | |
| 2019/0156096 A1 | 5/2019 | Lin et al. | |
| 2019/0179029 A1 | 6/2019 | Pacala et al. | |
| 2019/0255963 A1 | 8/2019 | Goei | |
| 2019/0256096 A1 | 8/2019 | Graf et al. | |
| 2019/0371093 A1 | 12/2019 | Edren et al. | |
| 2020/0064444 A1* | 2/2020 | Regani | G01S 7/006 |
| 2020/0125870 A1 | 4/2020 | Nishimura et al. | |
| 2020/0184808 A1 | 6/2020 | Ewert | |
| 2020/0211376 A1 | 7/2020 | Roka | |
| 2020/0280827 A1 | 9/2020 | Fechtal et al. | |
| 2020/0281030 A1 | 9/2020 | Kopchinsky et al. | |
| 2020/0287775 A1 | 9/2020 | Khasis | |
| 2020/0294401 A1 | 9/2020 | Kerecsen | |
| 2020/0329512 A1 | 10/2020 | Kennedy et al. | |
| 2020/0344824 A1 | 10/2020 | Kennedy et al. | |
| 2020/0413458 A1* | 12/2020 | Kennedy | H04L 67/12 |
| 2021/0042708 A1 | 2/2021 | Gardiner et al. | |

FOREIGN PATENT DOCUMENTS

| | | |
|---|---|---|
| CN | 110176153 | 8/2019 |
| GB | 2449476 | 11/2008 |
| KR | 20130041660 | 4/2013 |
| WO | WO9637079 | 11/1996 |
| WO | WO2012058022 | 5/2012 |
| WO | WO2016/012064 | 1/2016 |
| WO | WO2016184011 | 11/2016 |
| WO | WO2021055384 | 3/2021 |
| WO | WO2022026344 | 2/2022 |
| WO | WO2022072287 | 4/2022 |
| WO | WO2022081494 | 4/2022 |
| WO | WO2022109298 | 5/2022 |

OTHER PUBLICATIONS

European Search Report for EP Application 17815967.9 dated Dec. 4, 2019.
Office Action for U.S. Appl. No. 15/624,814, dated Aug. 22, 2017.
International Search Report and Written Opinion for PCT Application PCT/US2020/032389, mailed on Jul. 2, 2020.
International Search Report and Written Opinion for PCT Application PCT/US2020/027032, mailed on May 28, 2020.
International Search Report and Written Opinion for PCT Application PCT/US2020/039639, mailed on Sep. 28, 2020.
International Search Report for PCT Application PCT/US2021/052247, mailed on Jan. 13, 2022.
International Search Report for PCT Application PCT/US2020/041788, mailed on Oct. 22, 2020.
Intl Search Report PCT/US2021/054449, mailed on Dec. 23, 2021.
Written Opinion PCT/US2021/054449, Nov. 19, 2021.
Written Opinion and Search Report PCT/US2021/060137, Feb. 11, 2021.
Written Opinion and Search Report PCT/US2022/024296, Jul. 22, 2022.
Written Opinion PCT/US2022/020822, Jun. 11, 2022.
Siegel et al., A Survey of the connected vehicle landscape-Architectures, enabling technologies, applications and development areas, IEEE Transactions on Intelligent Transportation Systems 19.8 (2017): 2391-2406, Oct. 4, 2017.
International Search Report and Written Opinion for PCT Application PCT/US2022/033096, mailed on Sep. 6, 2022.
International Search Report and Written Opinion for PCT Application PCT/US2021/043096, mailed on Nov. 3, 2021.
Written Opinion for PCT Application PCT/US2021/052247, mailed on Jan. 13, 2022.
International Search Report for PCT Application PCT/US2020/050940 mailed on Dec. 3, 2020.
International Search Report for PCT Application PCT/US2023/32119, mailed on Nov. 21, 2023.
European Search Report for European patent application 20841078.7, mailed on Jul. 13, 2023.
European Search Report for European patent application 20808859.1, mailed on Apr. 28, 2023.
European Search Report for European patent application 20830628.2, mailed on May 23, 2023.
European Search Report for European patent application 20831321.3, mailed on Jun. 29, 2023.
PCT Application PCT/US2023/18893 Written Opinion mailed Jul. 21, 2023.
PCT Application PCT/US2023/18893 Intl Search Report mailed Jul. 21, 2023.

* cited by examiner

SYSTEM AND METHOD FOR MONITORING AND MINIMIZING VEHICLE CARBON EMISSIONS

CROSS REFERENCES TO RELATED APPLICATIONS

The Present Application is claim priority to U.S. Provisional Patent Application No. 63/334,051, filed on Apr. 22, 2022, and the Present Application is a continuation-in-part application of U.S. patent application Ser. No. 17/536,066, filed on Nov. 28, 2021, which is a continuation application of U.S. patent application Ser. No. 16/912,265, filed on Jun. 25, 2020, now U.S. Pat. No. 11,197,329, issued on Dec. 7, 2021, which claims priority to U.S. Provisional Patent Application No. 62/867,845, filed on Jun. 27, 2019, and U.S. patent application Ser. No. 16/912,265 is also a continuation-in-part application of U.S. patent application Ser. No. 16/870,955, filed on May 9, 2020, now U.S. Pat. No. 11,330,644, issued on May 10, 2022, which is a continuation-in-part application of U.S. patent application Ser. No. 16/416,396, filed on May 20, 2019, now U.S. Pat. No. 10,652,935, issued on May 12, 2020, which is a continuation-in-part application of U.S. patent application Ser. No. 16/118,436, filed on Aug. 31, 2018, now U.S. Pat. No. 10,334,638, issued on Jun. 25, 2019, which is a continuation application of U.S. patent application Ser. No. 15/917,633, filed on Mar. 11, 2018, now U.S. Pat. No. 10,070,471, issued on Sep. 4, 2018, which is a continuation application of U.S. patent application Ser. No. 15/624,814, filed on Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 16/912,265 is a continuation-in-part application of U.S. patent application Ser. No. 16/664,906, filed on Oct. 27, 2019, now U.S. Pat. No. 10,803,682, issued on Oct. 13, 2020, which is a continuation application of U.S. patent application Ser. No. 15/859,380, filed on Dec. 30, 2017, now U.S. Pat. No. 10,475,258, issued on Nov. 12, 2019, which is a continuation-in-part application of U.S. patent application Ser. No. 15/624,814, filed Jun. 16, 2017, now U.S. Pat. No. 9,961,710, issued on May 1, 2018, which claims priority to U.S. Provisional Patent Application No. 62/352,014, filed on Jun. 19, 2016, and U.S. patent application Ser. No. 15/859,380 claims priority to U.S. Provisional Patent Application No. 62/441,290, filed on Dec. 31, 2016, U.S. Provisional Patent Application No. 62/441,298, filed on Dec. 31, 2016, and U.S. Provisional Patent Application No. 62/441,315, filed on Dec. 31, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to the reduction of vehicle carbon emissions.

Description of the Related Art

In the 1980s, the Intergovernmental Panel on Climate Change ("IPCC") was established to quantify and understand climate change. The IPCC reached the conclusion that the climate was warming.

The primary driver of climate change is an increase in the concentration of carbon dioxide ($CO_2$) in the atmosphere. Natural sources and sinks produce and utilize $CO_2$ on a much larger scale but have existed in a carbon cycle equilibrium for thousands of years. It was only after the Industrial Revolution, when the practice of fossil fuel combustion became commonplace, that atmospheric $CO_2$ levels began to increase. Approximately 85% of the global energy needs are supplied by carbon-based fuels. The rapid economic development of China and India, fueled by inexpensive carbon-based fuels, are increasing $CO_2$ emissions.

Gasoline powered vehicles have been deployed everywhere for people to travel day by day to: complete their chores, get to and from work, and engage in personal activities. It has greatly enabled individual productivity from when the idea was first patented in 1886. This activity has also created a consequence of emitting greenhouse gases into Earth's atmosphere. Now, the climate crisis has focused individuals, corporations, and governments to reduce greenhouse gas emissions to zero. Civilization has been able to thus far properly address reductions of greenhouse gas emissions from the production of: electricity, chemical reactions to produce goods from raw materials, energy, businesses and homes, maintenance of livestock, and usage of cars, trucks, planes, trains and ships. While our world has actively engaged itself to reduce emissions in all of these sectors through electrification, there seems to be one vital sector that is being left behind: further reduction of emissions from existing gasoline engaged light-duty vehicles.

The light-duty vehicle industry has actively sought to reduce its greenhouse gas emissions for decades. Research and development investments have gone into making an Earth friendly light-duty vehicle, such as improving the catalytic converter, replacing the internal combustion engine system with an electric system, or adding an electric based engine to the gasoline powered vehicle propulsion process. Gasoline-powered vehicles still produce significant emissions; and even if a more efficient catalytic converter or energy reducing engine system is created or improved, it won't be affordable to most people that currently own and operate a functioning gasoline powered vehicle, especially in regions where electric vehicle adoption rates are concerningly underwhelming.

As the vastly anticipated electrification of the light-duty vehicle industry is under way, major car companies have committed hundreds of billions of dollars thus far to electrify the world vehicle fleet. Currently, an estimated 1.2 billion cars on our roads are powered by fossil fuels. It is disastrously anticipated that still, new models in future years will still consume fossil fuels and produce greenhouse gas emissions.

Onboard carbon capture technology has become feasible for large internal combustion engines in industries such as maritime transport and heavy duty trucking. Attempts to capture carbon dioxide from the tailpipes of light-duty vehicles have been attempted before, but onboard conversion caused the entire process to be environmentally uneconomical. By capturing emissions at the tailpipe and converting the emissions using a conversion device unattached to the light duty vehicle, the environmental economics become feasible.

U.S. Pat. No. 9,215,590 for Authentication Using Vehicle Data Pairing discloses the wireless pairing of a portable device with an on-board computer of a vehicle for authenticating a transaction with a third party.

General definitions for terms utilized in the pertinent art are set forth below.

Assigning authority engine is a computer device running a software program that determines the parameters of an electric vehicle charging session based on input received over a network from the connected vehicle devices, passive devices, other devices, and/or other settings. The assigning authority engine is optionally stored in the cloud or on premise.

Beacon is a management frame that contains all of the information about a network. As specified in IEEE 802.11 for Wireless Local Area Network (WLAN), Beacon frames are periodically transmitted to announce the presence of the network. Beacon frames typically include the WLAN's service set identifier (SSID).

BLUETOOTH technology is a standard short range radio link that operates in the unlicensed 2.4 gigaHertz band, defined in IEEE 802.15.1 originally an now by the Bluetooth Special Interest Group (SIG).

File Transfer Protocol (FTP) is a protocol for moving files over a network from one computer to another.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of networked computers and data-transmission paths which can supply information to a connected and browser-equipped client computer, and can receive and forward information entered from the client computer.

Media Access Control (MAC) Address is a unique identifier assigned to the network interface by the manufacturer.

Memory generally includes any type of integrated circuit or storage device configured for storing digital data including without limitation ROM, PROM, EEPROM, DRAM, SDRAM, SRAM, flash memory, and the like.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Processor generally includes all types of processors including without limitation microprocessors, general purpose processors, gate arrays, array processors, application specific integrated circuits (ASICs) and digital signal processors.

Secure Connection Packet (SCP) is used to provide authentication between multiple devices or a local party and remote host to allow for secure communication or the transfer of computer files.

Service Set Identifier (SSID) is a 1 to 32 byte string that uniquely names a wireless local area network.

Transfer Control Protocol/Internet Protocol (TCP/IP) is a protocol for moving files over the Internet.

Uniform Resource Locator (URL) is an address on the World Wide Web.

User Interface (UI) is the junction between a user and a computer program. An interface is a set of commands or menus through which a user communicates with a program. A command driven interface is one in which the user enter commands. A menu-driven interface is one in which the user selects command choices from various menus displayed on the screen.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

There are multiple sources of data that can be utilized by a vehicle for efficiency and cost savings. However, there is a need for collecting, processing and interpreting the data in a manner that can be utilized by a vehicle.

BRIEF SUMMARY OF THE INVENTION

The present invention is a method and system for monitoring and minimizing vehicle carbon emissions, for a known vehicle connected through a secure mobile network.

At a minimum the present invention preferably requires (i) either a CVD or operator interface device, or combination (both CVD and operator interface device), (ii) at least one off-vehicle source; in order to provide resulting measures, calculations, or user-configured reports to enable, disable, or manage at least one function of an authorized remote terminal, or operator interface device (e.g., mobile device, in dash display, heads-up display other connected device) over a secure wireless network.

The software or processing capability (firmware or hard-coded CPU) can reside on the CVD, or on an operator interface device, or device connected (wireless or fixed connection) to the CVD (for example, an in-dash display) or the operator interface device.

One aspect of the present invention is a system for monitoring and minimizing vehicle carbon emissions, for a known vehicle connected through a secure mobile network. The system comprises a mobile device for a vehicle, a connected vehicle device (CVD) comprising on-vehicle data for a vehicle, and at least one off-vehicle source selected from a group comprising at least one database, at least one cloud source, or at least one physical structure with a communication device. The mobile device is configured to access and combine off-vehicle content with on-vehicle data relating to carbon emissions, in order to enable, disable or manage at least one function of the mobile device over a secure wireless network.

Another aspect of the present invention is a method for controlling a function of a mobile device over a secure wireless network for monitoring and minimizing vehicle carbon emissions. The method includes accessing, from at least one off vehicle source, off-vehicle content at a mobile device for a vehicle. The method also includes accessing, from a connected vehicle device (CVD), on-vehicle data for a vehicle at the mobile device for a vehicle. The method also includes combining the off-vehicle content with the on-vehicle data relating to carbon emissions in order to enable, disable or manage at least one function of the mobile device over a secure wireless network. The at least one off vehicle source selected from a group comprising at least one database, at least one cloud source, or at least one physical structure with a communication device.

Yet another aspect of the present invention is a method for monitoring and minimizing vehicle carbon emissions, for a known vehicle connected through a secure mobile network. The method includes accessing, through a plurality of permissions granted and managed by an assigning authority engine, data for a mobile object relating to carbon emissions comprising at least one of an operator event, a data event or a sensor event data. The method also includes informing an instruction set based on the data and at least one input from off-board data and on-board data, wherein the instruction set creates an output, wherein the output is sequenced and associated with a single common time signature by a session engine. The method also includes initiating a record of one or more outputs into a super-set of outputs managed by the session engine to generate an event session, wherein each output of the super-set of outputs is associated with a same single common time signature and event. The event session provides a record of the total outputs created from at least one data stream of the mobile object comprising data relating to carbon emissions collected within a defined period of time.

The mobile device preferably comprises a remote profile manager (RPM) toolset. The RPM is configured to execute the plurality of dynamic, temporal combinations to access data relating to carbon emissions to inform the plurality of instruction sets. The RPM is configured to use one or more elements of the data to synchronize on-vehicle data elements or a computational output of the off-vehicle content, to generate a new information data set combination.

The system further comprises an assigning authority. The assigning authority instructs the mobile device for permitted actions by an operator of the vehicle and/or time frames for the permitted actions. The assigning authority is configured to adapt to a present environment based on data relating to carbon emissions from the RPM. The assigning authority is configured to enable, disable or manage the at least one function of the mobile device over a secure wireless network based on data relating to carbon emissions.

The system further comprises an assigning authority. The assigning authority instructs the mobile device for permitted actions by an operator of the vehicle and/or time frames for the permitted actions. The assigning authority is configured to adapt to a present environment based on data relating to carbon emissions from the RPM. The assigning authority is configured to enable, disable or manage the at least one function of the mobile device over a secure wireless network based on data relating to carbon emissions.

The off-vehicle content comprises at least one of weight, altitude, temperature, speed limit, and traffic conditions.

The vehicle preferably comprises at least one on-board sensor to measure carbon emissions from the vehicle.

Yet another aspect of the present invention is a non-transitory computer-readable medium that stores a program that causes a processor to perform functions for instructing a vehicle to minimize carbon emissions by executing the following steps: determine a real-time GPS location for a vehicle; calculate the carbon emissions for the vehicle based on a configuration of the vehicle, the real-time GPS location of the vehicle, real-time vehicle data, at least one dynamic compliance rule, and a selected carbon emissions profile; and transmit to the vehicle guidance to minimize the carbon emissions of the vehicle, wherein the guidance includes deal acceleration and braking, routing/navigation, recommended shut-off engine idle.

Yet another aspect of the present invention is a system for monitoring and minimizing vehicle exhaust emissions for a known vehicle connected through a secure wireless network. The system comprises a CVD comprising on-vehicle data for a vehicle and at least one off-vehicle source. The off-vehicle source is at least one database, at least one cloud source, or at least one physical structure with a communication device. The CVD is configured to access and combine off-vehicle content with on-vehicle data relating to vehicle exhaust emissions, to enable, disable or manage at least one function of the vehicle or CVD over a secure wireless network.

Yet another aspect of the present invention is a method for controlling a function of an operator interface device over a secure wireless network for monitoring and minimizing vehicle exhaust emissions. The method includes accessing, from at least one off vehicle source, off-vehicle content at the operator interface device for the vehicle. The method also includes accessing, from a connected vehicle device (CVD), on-vehicle data for a vehicle at the operator interface device for the vehicle. The method also includes combining the off-vehicle content with the on-vehicle data relating to exhaust emissions in order to enable, disable or manage at least one function of the vehicle or operator interface device over a secure wireless network. The at least one off vehicle source selected from a group comprising at least one database, at least one cloud source, or at least one physical structure with a communication device.

Yet another aspect of the present invention is a method for monitoring and minimizing exhaust emissions for a known mobile object connected through a secure mobile network. The method includes accessing, through a plurality of permissions granted and managed by an assigning authority engine, data for a mobile object relating to exhaust emissions comprising at least one of an operator event, a data event or a sensor event data. The method also includes informing an instruction set based on the data and at least one input from off-board data and on-board data, wherein the instruction set creates an output, wherein the output is sequenced and associated with a single common time signature by a session engine. The method also includes initiating a record of one or more outputs into a super-set of outputs managed by the session engine to generate an event session, wherein each output of the super-set of outputs is associated with a same single common time signature and event. The event session provides a record of the total outputs created from at least one data stream of the mobile object comprising data relating to carbon emissions collected within a defined period of time.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
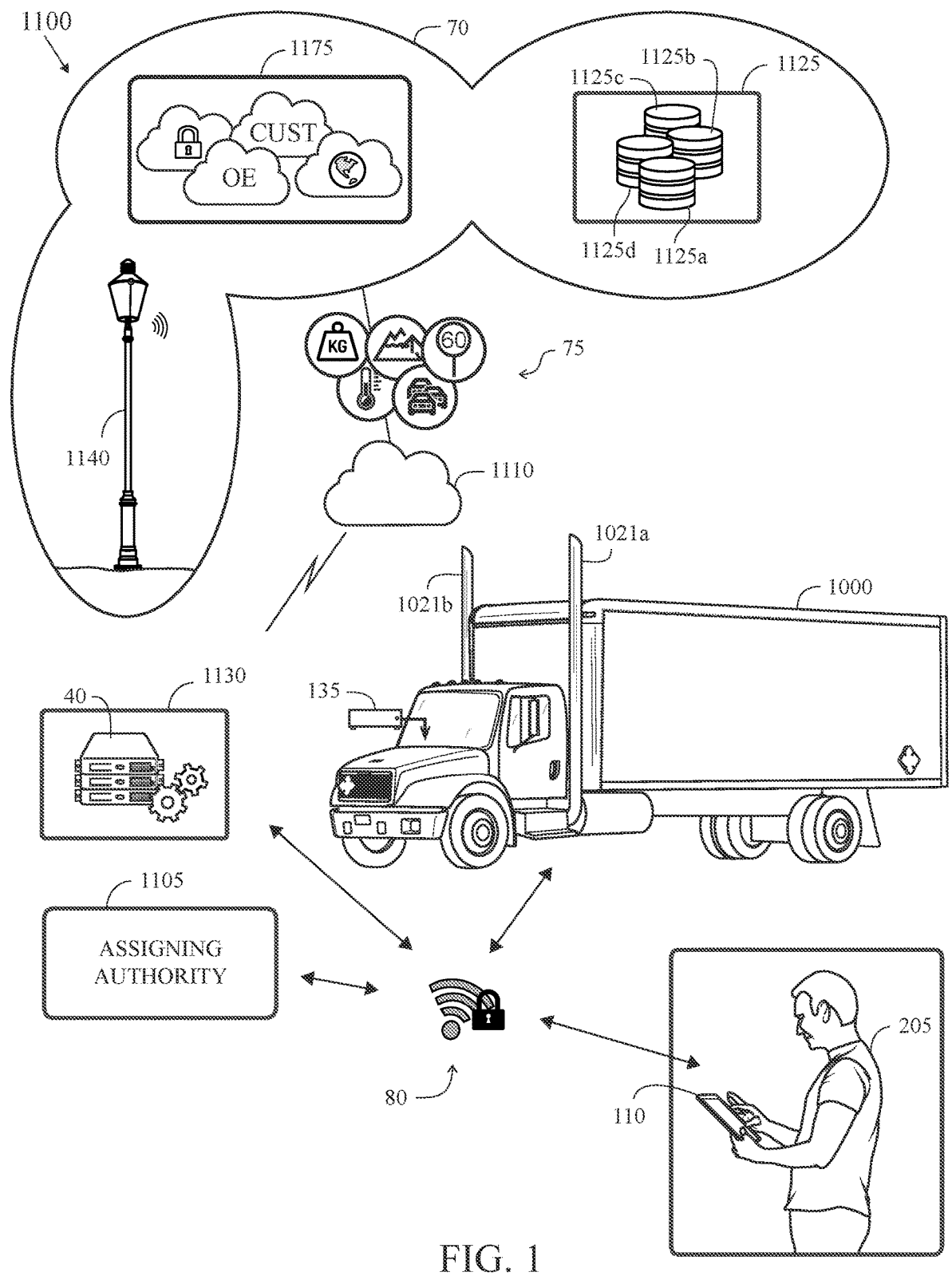
FIG. 1 is a block diagram of a system for remote profile management for utilizing data and computational information from on-vehicle and off-vehicle sources.

The present invention is a system and method for monitoring and minimizing vehicle carbon emissions, for a known vehicle connected through a secure mobile network, based on one or more variables (acceleration feedback, routing, etc). Vehicle exhaust gases are usually measured using an exhaust gas analyzer, which is used for measuring four exhaust gases: nitrogen oxide (NO); Nitrous Oxide ($NO_2$); carbon monoxide (CO); carbon dioxide ($CO_2$); and hydrocarbons (HC). The sensor can also measure exhaust particulate mass and exhaust particle numbers.

There are triggered events for the mobile device where the on-vehicle and/or off-vehicle data includes carbon emissions-affecting measurements.

The present invention determines exhaust and other emission-affecting measurements, preferably using an RPM or a system disclosed in Kennedy et al., U.S. Patent Publication Number 20220104288, which is hereby incorporated by reference in its entirety, from vehicle data such as speeds/acceleration, operating modes, vehicle-miles traveled fractions, starts and idling, temperatures, and average gasoline fuel properties. It also determines the type of fuel (gasoline, diesel, ethanol formulated gasoline, natural gas) used, and the amount of fuel consumed using fuel x formula.

An RPM is configured to execute plurality of dynamic, temporal combinations to access data relating to carbon emissions to inform the plurality of instruction sets. The RPM also provides a user configured report.

The present invention preferably determines the inspection/maintenance of vehicles, antitampering programs and the amount of fuel consumed.

The present invention provides driver feedback and instructions for minimizing, including acceleration feedback, routing, such as disclosed in Fields et al., U.S. Publication Number 20220086924 for Remote Mobile Device Management, which is hereby incorporated by reference in its entirety.

Operator feedback features include a software program that factors in data (weight, altitude, temperature, speed limit, traffic conditions, etc.) to provide ideal acceleration and braking for minimizing emissions.

The present invention also includes data triggering with an automated, configurable action/response for routing/navigation and an idle engine shut off.

The present invention provides configured reports and event sessions to a back office or third party, such as GHE filing that can be provided to customers.

One embodiment is a system for monitoring and minimizing vehicle carbon emissions, for a known vehicle connected through a secure mobile network comprises a mobile device for a vehicle, a connected vehicle device (CVD) comprising on-vehicle data for a vehicle, an assigning authority, and at least one off-vehicle source selected from a group comprising at least one database, at least one cloud source, or at least one physical structure with a communication device. The mobile device is configured to access and combine off-vehicle content with on-vehicle data relating to carbon emissions, in order to enable, disable or manage at least one function of the mobile device over a secure wireless network. The system provides measuring, driver feedback, reporting and/or instruction sets. The system determines acceleration, provides feedback and routing. Constraints of the system include timing, distance, hours of service (HOS), percent completion requirements and any other configurable quality or characteristic. Inputs for the system are preferably from on vehicle sensors, input data from derived applications, instruction sets delivered by the assigning authority, and off-vehicle sources such as infrastructure and beacons.

FIG. 1 is a block diagram of a system 1100 for monitoring and minimizing vehicle exhaust emissions for a known vehicle connected through a secure wireless network. The system 1100 includes a connected vehicle device (CVD) 135 comprising on-vehicle data for a vehicle 1000 and at least one off-vehicle source 70 selected from a group comprising at least one database 1125, at least one cloud source 1175, or at least one physical structure 1140 with a communication device. The CVD 135 is configured to access and combine off-vehicle content 75 with on-vehicle data relating to vehicle exhaust emissions, to enable, disable or manage at least one function of the vehicle 1000 or the CVD 135 over a secure wireless network 80.

The system 1100 preferably comprises an operator interface device, comprising a remote profile manager (RPM) toolset 1130. The RPM 1130 is configured to execute the plurality of dynamic, temporal combinations to access data relating to vehicle exhaust emissions to inform the plurality of instruction sets. The RPM 1130 is also configured to use one or more elements of the data to synchronize on-vehicle data elements or a computational output of the off-vehicle content, to generate a new information data set combination.

The assigning authority engine 1105 instructs the operator interface device for permitted actions by an operator 205 of the vehicle 1000 and/or time frames for the permitted actions. The assigning authority 1105 is also configured to adapt to a present environment based on data relating to vehicle exhaust emissions from the RPM 1130. The assigning authority 1105 can also enable, disable or manage the function, or functions, of the operator interface device 110 over the secure wireless network 80 based on data relating to vehicle exhaust emissions. Enabling, disabling, and managing functions comprises at least one application, at least one feature, or at least one widget.

The on-vehicle data preferably comprises at least one of speeds/acceleration, operating modes, vehicle-miles traveled, starts and idling, temperatures, average gasoline fuel properties, type of fuel used, the amount of fuel consumed, gear position, fuel level, engine rotations per minute, location, or drive status.

The off-vehicle content 75 preferably comprises at least one of weight, altitude, temperature, speed limit, and traffic conditions.

The vehicle 1000 preferably includes at least one on-vehicle sensor 1022 (FIG. 4A/B) to measure vehicle exhaust emissions. The vehicle 1000 also includes a connected vehicle device (CVD) 135 and exhaust pipes 1021*a* and 1021*b*.

The CVD 135 is configured to access and combine off-vehicle content with on-vehicle data relating to vehicle exhaust emissions to generate resulting measures, calculations, or user-configured reports to enable, disable, or manage at least one function of an authorized remote terminal.

The vehicle 1000, an assigning authority engine 1105, a remote profile manager (RPM) toolset 1130 with an RPM sync program, and a plurality of databases 1125, are accessible through the cloud 1110. The remote profile manager toolset 1130 preferably includes a server 40. The plurality of databases 1125 is preferably composed of multiple databases 1125*a-d*.

The assigning authority engine 1105 preferably has a work assignment that has been generated for a specific vehicle 1000 for monitoring and minimizing vehicle carbon emissions. In a preferred embodiment, the assigning authority engine 1105 resides at a server for the system 1100, and the RPM toolset 1130 resides at a separate server 40. Alternatively, the assigning authority engine 1105 and the RPM toolset 1130 reside at the same server. The assigning authority engine 1105 is preferably configured to access and combine off-vehicle content and on-vehicle data, along with the work assignment, to produce dynamic, temporal combinations of data elements and instructions for the vehicle 1000. Additionally, the assigning authority engine 1105 provides permission to various applications to share data for app-to-app integration. In one example, the assigning authority engine 1105 grants permission to a workflow application running on a mobile communication device for the vehicle 1000 to obtain data from a navigation application running on the mobile communication device. The assigning authority engine 1105 instructs the navigation application to share the data with the workflow application. In one specific example, the shared data is GPS coordinates for the vehicle.

Figure 2:
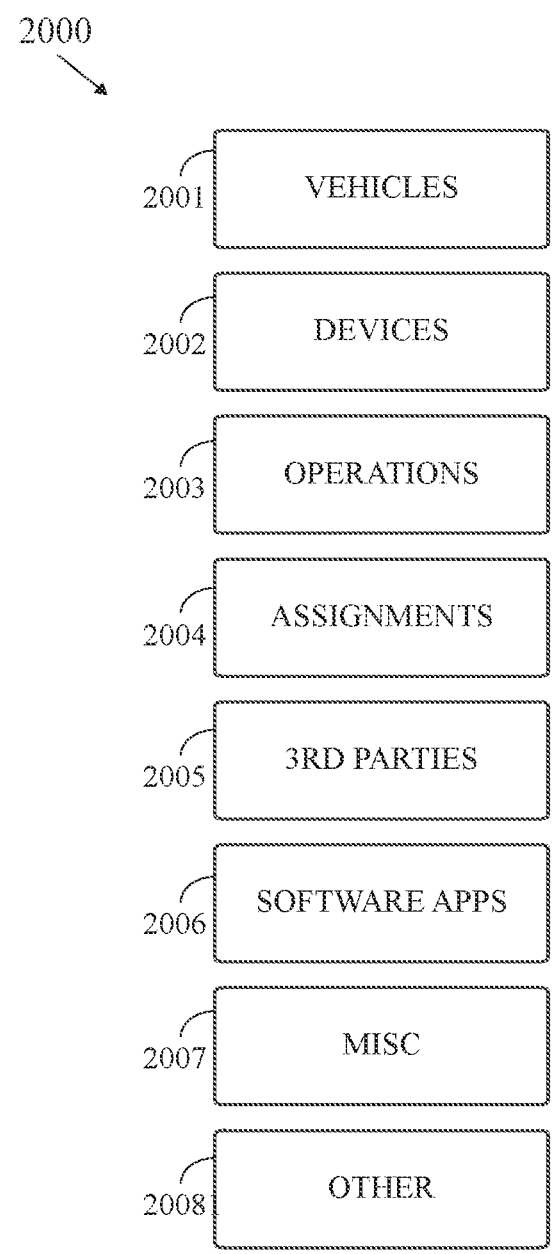
FIG. 2 is a block diagram of sources of data for remote profile management for a vehicle.

FIG. 2 is a block diagram of a set 2000 of sources of data for remote profile management for a vehicle for monitoring and minimizing vehicle carbon emissions. The set 2000 preferably includes vehicles 2001, devices 2002, operations 2003, assignments 2004, third parties 2005, software apps 2006, miscellaneous 2007 and other 2008.

Figure 3:
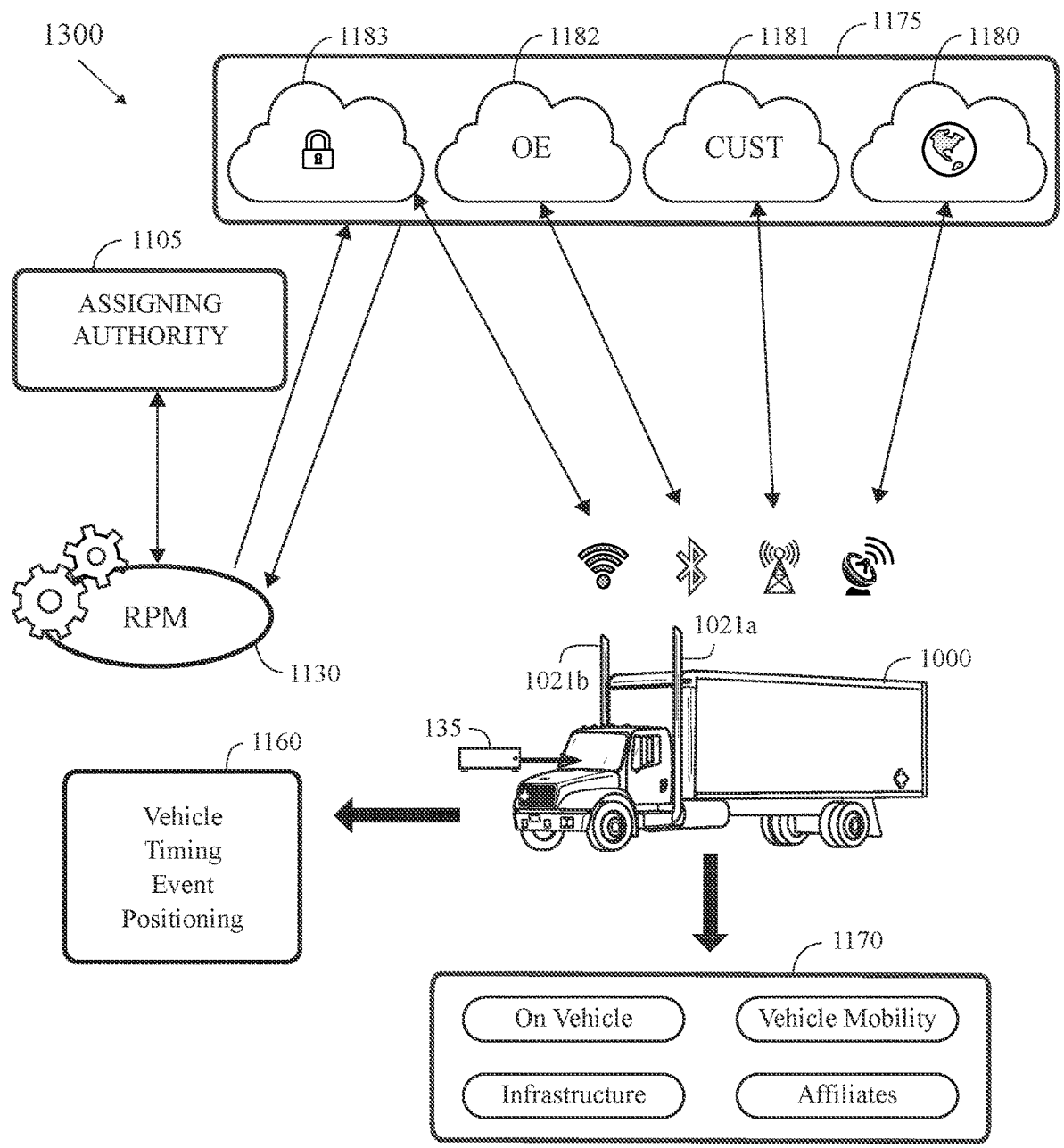
FIG. 3 is a block diagram of a system for remote profile management for utilizing data and computational information from on-vehicle and off-vehicle sources.

FIG. 3 is a block diagram of a system 1300 for remote profile management for utilizing data and computational information from on-vehicle and off-vehicle sources for monitoring and minimizing vehicle carbon emissions. As shown in FIG. 3, the system 1300 comprises an assigning authority engine 1105, a remote profile manager toolset 1130, databases 1125 (FIG. 1), cloud sources 1175, a vehicle 1000 and a CVD 135 within the vehicle 1000. The cloud sources 1175 include a main protected server/cloud 1183, an original equipment manufacturer server/cloud 1182, a customer server/cloud 1181 and a public server/cloud 1180. Multiple other servers/clouds and/or databases can be utilized with the present invention without departing from the scope and spirit of the claims. The cloud sources 1175, databases 1125, RPM 1130 and assigning authority engine 1105 communicate with the CVD 135 utilizing various wireless communication protocols including WiFi, cellular networks, BLUETOOTH, GPS, and the like. The contents of each of the databases (1125*a*-1125*d*) and cloud sources 1175 are accessible and combinable by the assigning authority engine 1105 to produce dynamic, temporal combinations of data elements and instructions for the vehicle 1000. The assigning authority engine 1105 is configured to use the remote profile manager toolset 1130 to execute the dynamic, temporal combinations. The dynamic, temporal combinations access data from the cloud sources comprising third party data and vehicle, timing, event, and/or positioning ("VTEP") data 1160 to inform instruction sets delivered by the assigning authority engine 1105. The instruction sets are preferably temporal permission for the on-vehicle sources and off-vehicle sources to connect and share data with each other. One or more elements of the VTEP data 1160 is used as the basis to synchronize timing between the data, or computational outputs of two or more sources of electronic information. A single coherent information picture 1170 is formed from fusing data and computational information from the on-vehicle and the off-vehicle sources. The new information data set combination (single coherent information picture 1170) is a display of information generated from the combination of data from the on-vehicle sources and the off-vehicle sources. The data set can include dynamic route information (road condition changes due to weather, construction and the like), an updated driver's profile, vehicle engine date, cargo data, dynamic compliance rules, micro-navigation data, fuel stop data, inspection stations on the route, wireless communications connectivity status, time to destination, and the like. An example of a new information data set combination is imparting GPS location data from a truck/CVD onto cargo (the potato chips example, described herein). The new information data set combination is preferably any new combination of the connected data sources data for the specific vehicle of interest.

In reference to FIG. 3, the vehicle 1000 has multiple endpoints with direct connectivity to the CVD 135, and requires no routing through a cloud service. The vehicle also has exhaust pipes 1021*a* and 1021*b*. The endpoints are user interfaces or built-in displays, devices connected through fixed or wireless connection to the vehicle's CVD 135, sensors connected through a vehicle bus 105 (FIG. 4B) to the CVD 135, or directly to the CVD 135 via wired or wireless connection (FIG. 4C), like devices. The vehicle 1000 is preferably a primary generator and source of VTEP data 1160.

The RPM 1130 preferably comprises a RPM sync for syncing with other devices, servers, the Cloud, the CVD and the like.

The real-time data for the vehicle 1000 preferably comprises a real-time speed of the vehicle, tire pressure values from a plurality of tire sensors, refrigeration/HVAC unit values, a plurality of fluid levels, a plurality of power unit values, a real-time fuel tank capacity, and a fuel type.

The plurality of configurable real-time vehicle data trigger events comprises a value outside of a predetermined range for the real-time data of the vehicle.

The real-time driver/operator profile comprises an amount of time driving during a pre-determined time period, a number of rest breaks during the pre-determined time period, license compliance data, physical disabilities and driving violations.

One example of an off-vehicle source is a fuel stop. A profile of a fuel stop preferably comprises real-time types of fuels available, set billing instructions, physical dimensions of a plurality of fuel pumps, GPS coordinates, hours of operation, food service availability, and resting area availability. The predetermined fueling time period is a time range to fuel the vehicle based on the real-time GPS location of the vehicle, the real-time speed of the vehicle, the distance to the selected fuel stop from the real-time GPS location of the vehicle, and the hours of operation of the fuel stop.

A configuration of the vehicle 1000 is preferably selected from one of a single trailer, a dual trailer, a triple trailer, and a refrigeration trailer.

Another example of an off-vehicle source is a database (Federal, State local) with dynamic compliance rules. The dynamic compliance rules comprise speed limits, transport of toxic waste, the transport of refrigerated cargo, the rest durations for drivers/operators, the necessary insurance coverage, and the type of taxes and fees to be paid.

The workflow utilized by the assigning authority engine 1105 preferably comprises an origination location of the vehicle, a destination of the vehicle, a route to the destination, a cargo, a time of departure and a time of arrival.

In one non-limiting example, the assigning authority engine 1105 receives data over the cloud from a customer server 1181 that a shipment of bags of potato chips were damaged in transit. The assigning authority engine 1105 accesses a CVD 135 or mobile device for the vehicle that delivered the bags of potato chips to determine the origination location, the destination location and the route. The assigning authority engine 1105 uses a navigation app on the mobile device (tablet computer) to determine the route, and an elevation of the route. The assigning authority engine 1105 determines that the vehicle traveled over a high elevation mountain range that probably resulted in the damage to the bags of potato chips due to a pressure differential. The assigning authority engine 1105 uses this information to reroute a subsequent shipment of bags of potato chips to avoid the high elevation mountain range.

Figure 4A:
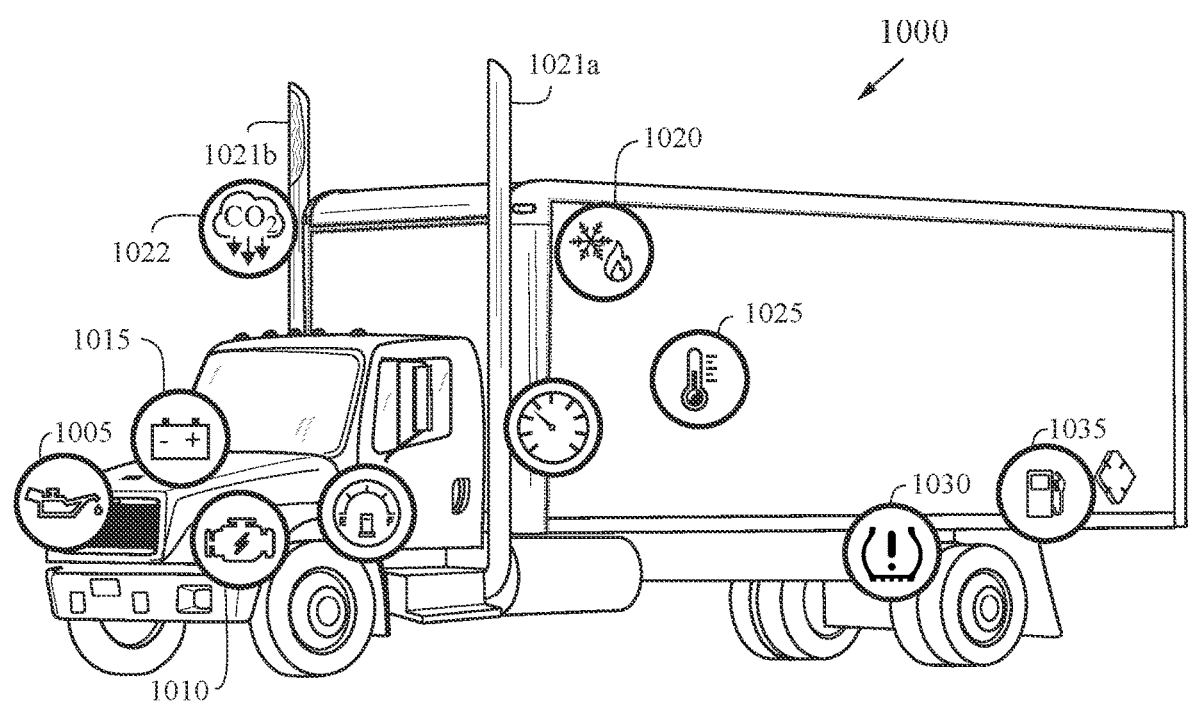
FIG. 4A is an illustration of multiple sensors on a truck.

FIG. 4A is an illustration of multiple sensors on a truck 1000. The vehicle/truck 1000 preferably comprises an oil level sensor 1005, an engine sensor 1010, a power sensor 1015, a refrigeration/HVAC sensor 1020, a temperature sensor 1025, a tire pressure sensor 1030, and a fuel sensor 1035. The vehicle/truck 1000 also comprises exhaust pipes 1021a and 1021b, and an emissions sensor 1022. The emission sensor 1022 preferably measures vehicle exhaust gases using an exhaust gas analyzer, which is used for measuring four exhaust gases: nitrogen oxide (NO); Nitrous Oxide (NO2); carbon monoxide (CO); carbon dioxide (CO2); and hydrocarbons (HC). The emission sensor 1022 can also measure exhaust particulate mass and exhaust particle numbers. Those skilled in the pertinent art will recognize that multiple other sensors may be utilized without departing from the scope and spirit of the present invention.

Figure 4B:
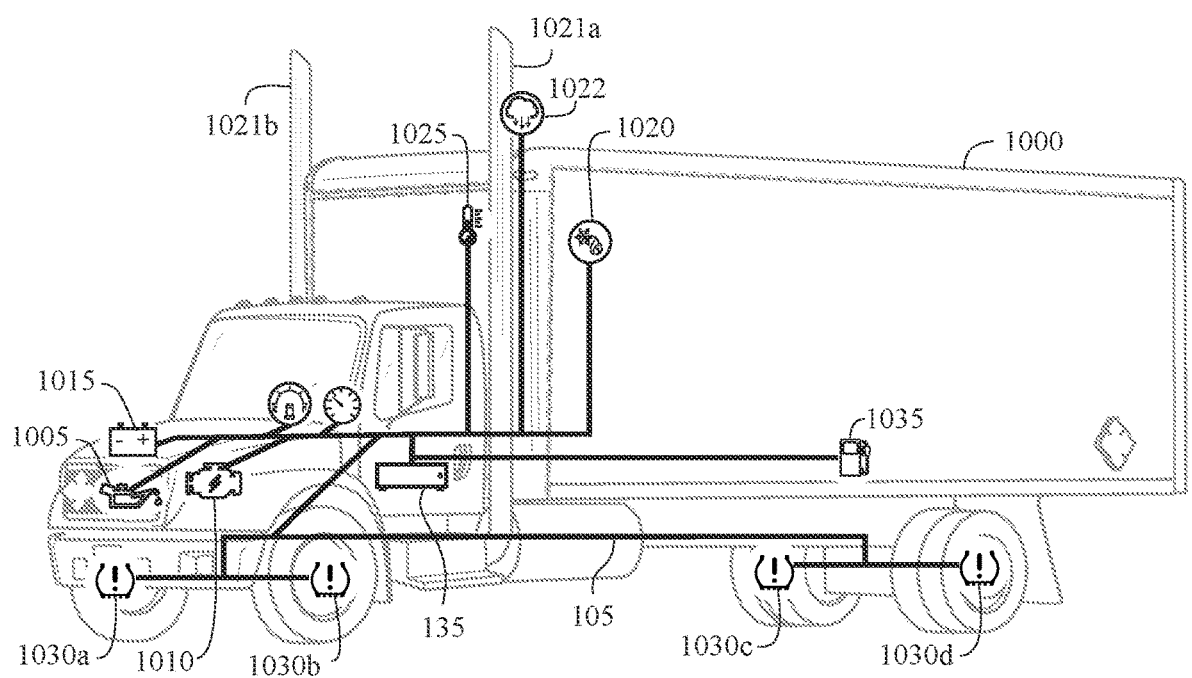
FIG. 4B is an illustration of multiple sensors on a truck connected to a BUS for the truck.
Figure 4C:
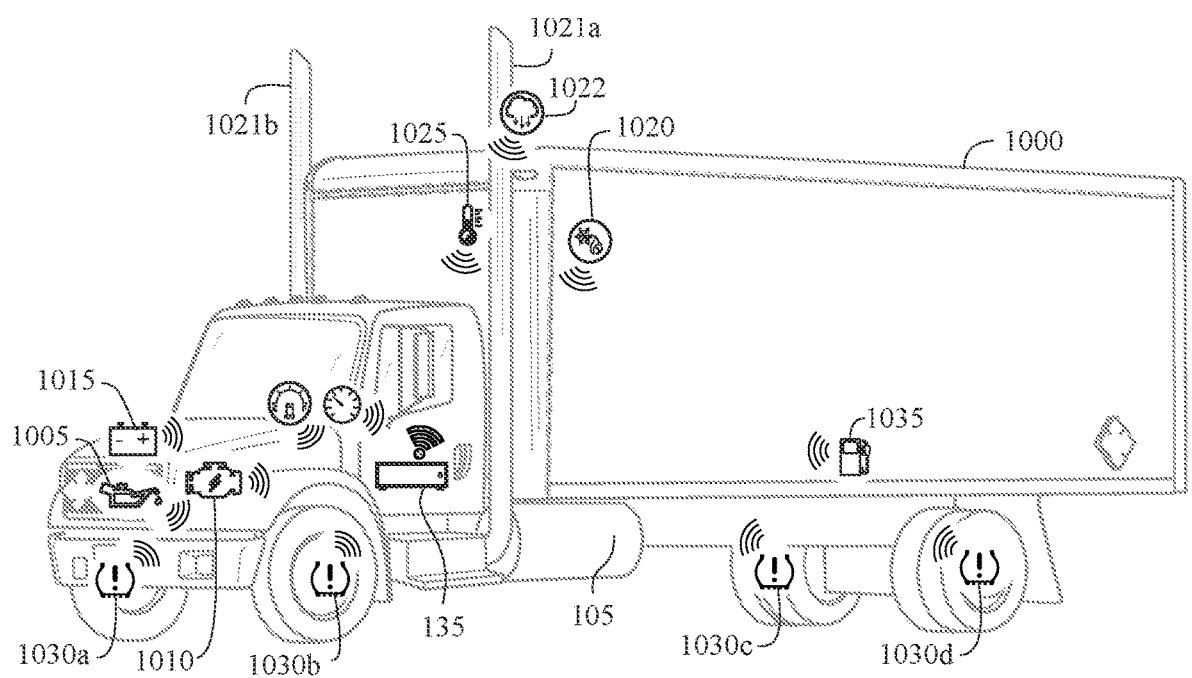
FIG. 4C is an illustration of multiple sensors on a truck wirelessly connected to the CVD of the truck.

FIG. 4B is an illustration of multiple sensors on a truck 1000 connected to a data bus 105 for the truck 1000. Each of the sensors (oil level sensor 1005, engine sensor 1010, a power sensor 1015, a refrigeration/HVAC sensor 1020, a temperature sensor 1025, tire pressure sensors 1030a-d, a fuel sensor 1035, and an emissions sensor 1022) is preferably connected to the data bus 105 for transferring data to an on-board computer of the vehicle 1000, or directly to the CVD 135. Alternatively, some or all of the sensors use wireless communications to communication with the CVD 135, as shown in FIG. 4C.

Figure 5:
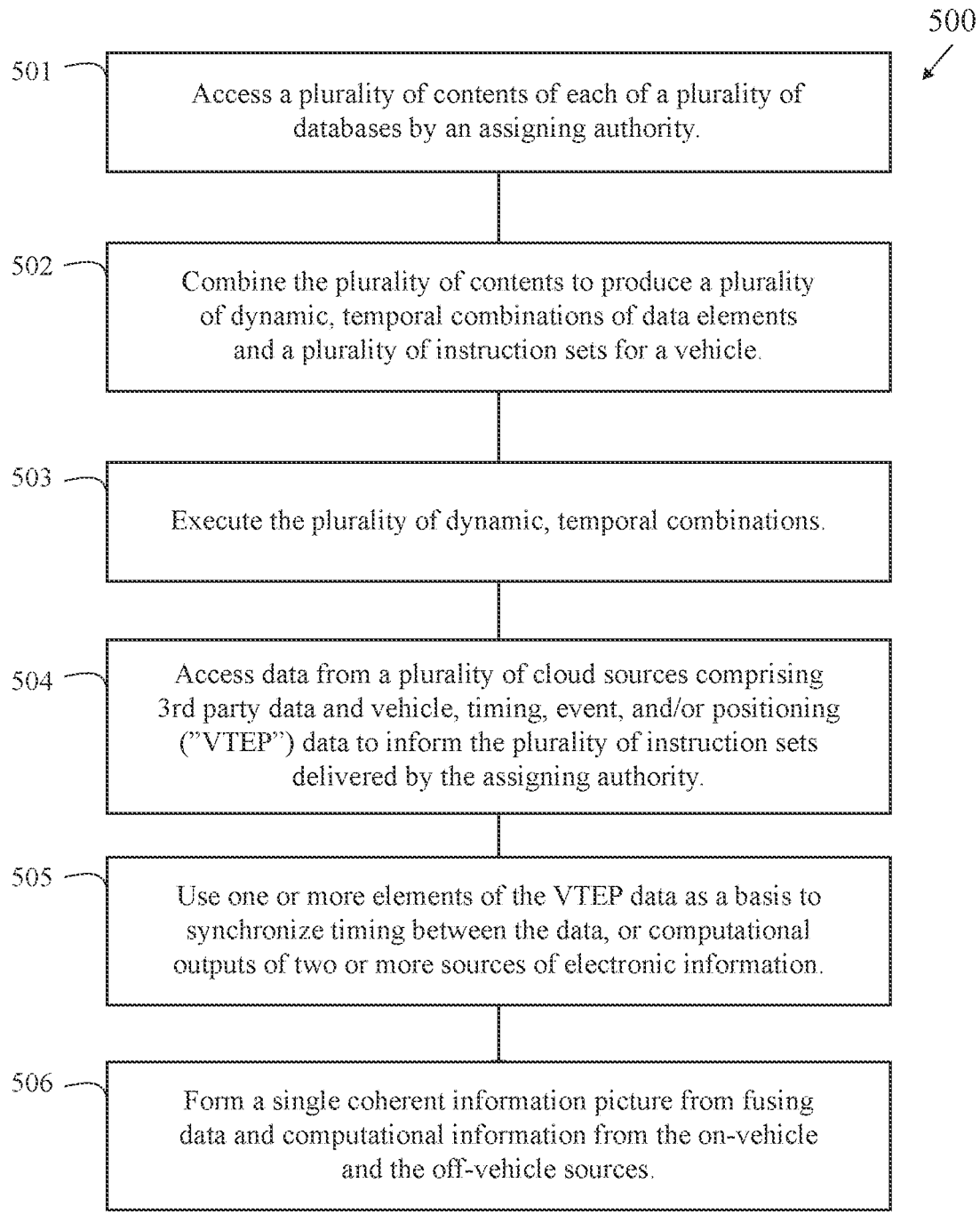
FIG. 5 is a flow chart for a method for remote profile management for utilizing data and computational information from on-vehicle and off-vehicle sources.

FIG. 5 is a flow chart for a method 500 for remote profile management for utilizing data and computational information from on-vehicle and off-vehicle sources for monitoring and minimizing vehicle carbon emissions. At block 501, the contents of each of a plurality of databases are accessed by an assigning authority engine. At block 502, the contents are combined to produce a plurality of dynamic, temporal combinations of data elements and a plurality of instruction sets for a vehicle. At block 503, the plurality of dynamic, temporal combinations is executed. At block 504, data from a plurality of cloud sources comprising third party data and vehicle, timing, event, and/or positioning ("VTEP") data is accessed to inform the plurality of instruction sets delivered by the assigning authority engine to the RPM. At block 505, one or more elements of the VTEP data is used as a basis to synchronize timing between the data, or computational outputs of two or more sources of electronic information. At block 506, a single coherent information picture is formed from fusing data and computational information from the on-vehicle and the off-vehicle sources.

Figure 6A:
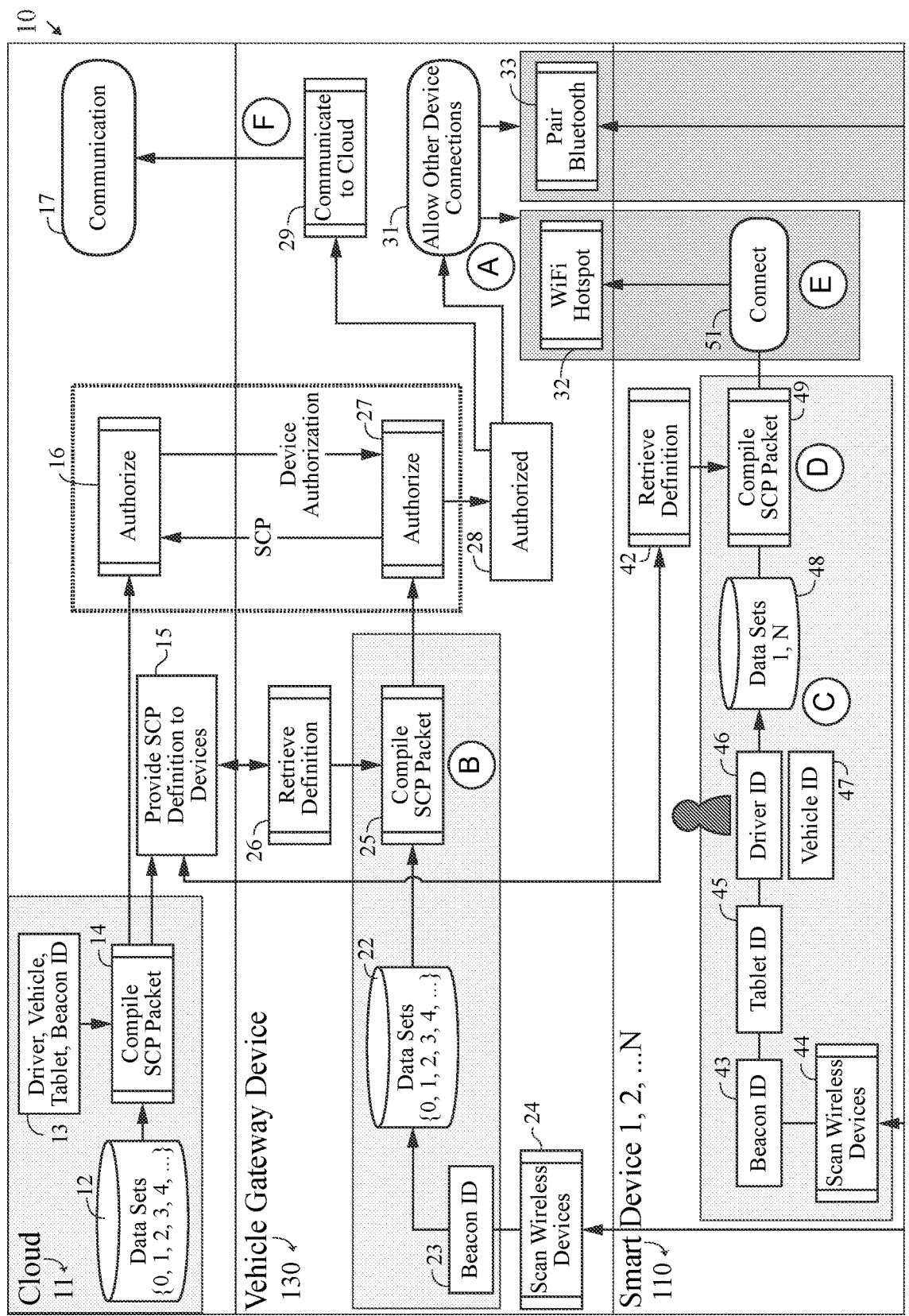
FIG. 6A is a block diagram of a system for a secure communication protocol for connecting a wireless device to a single access point in a vehicle.
Figure 6B:
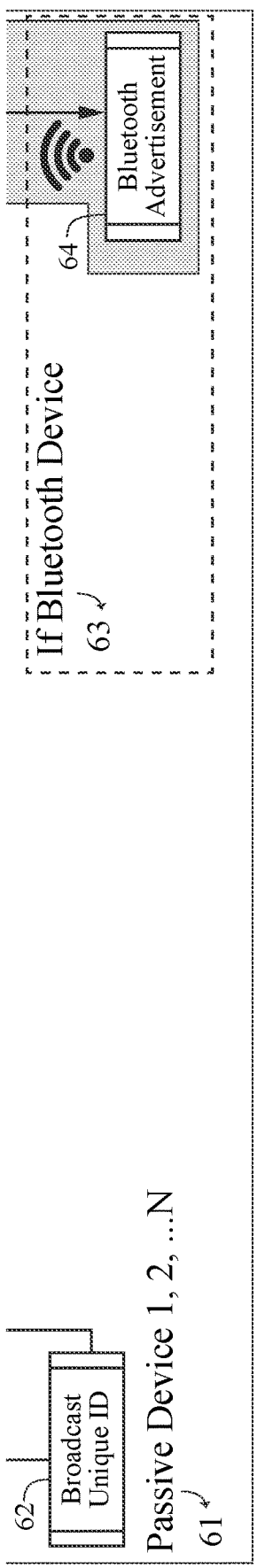
FIG. 6B is a continuation of the block diagram of FIG. 6.

FIG. 6A and FIG. 6B show a system 10 for securely connecting a wireless device to a single access point in a vehicle for a predetermined work assignment for monitoring and minimizing vehicle carbon emissions. The system 10 preferably comprises a remote server (cloud) 11, a vehicle gateway device 130, a smart device 110, and a passive device 61. The vehicle gateway device 130 is preferably a connected vehicle device ("CVD" 135).

The server/cloud 11 accesses dataset 12 and obtains driver information. Vehicle information, mobile device information (MAC address), passive device information (beacon ID), and other information to compile a SCP packet 14. At block 15, the server 11 provides SCP definitions to the vehicle gateway device 130 and the mobile device 110. At block 16 the server/cloud 11 authorizes the SCP. At block 17, the server/cloud 11 communicates with the vehicle gateway device 130.

The vehicle gateway device 130 compiles a CVD compiled SCP packet 25 using datasets 22, the beacon ID 23, a scan of wireless devices 24, and the SCP definitions 26 received from the server/cloud 11. The CVD compiled SCP packet is sent to the cloud/server 11 at block 16 and authorization/validation of the CVD compiled SCP packet is received at block 27. At block 28 the SCP is authorized for broadcasting at the vehicle gateway device 130 a wireless network with a hidden and hashed SSID unique to the vehicle, the hidden and hashed SSID generated from the validated SCP packet. At block 29, the vehicle gateway device 130 communicates the broadcast with the server/cloud 11. At block 31, the vehicle gateway device 130 communicates with other devices, namely the smart device 110 over preferably a WiFi hotspot 32 and the passive device 61 by pairing using a BLUETOOTH communication protocol at block 33.

At block 49, the smart device (mobile device) 110 compiles a complied mobile device SCP packet from the SCP definitions 42, the data sets 48, the beacon ID 43, the Tablet ID 45, a driver ID 46, a vehicle ID 47 and scan of wireless devices 44. The mobile device 110 generates the hashed SSID and a passphrase from the complied mobile device SCP packet. At block 51, the mobile device 110 connects to the WiFi hotspot 32 of the vehicle gateway 130.

The passive device 61 broadcast a unique ID at block 62 which is received by the mobile device 110 and the vehicle gateway device 130. At block 63, if a BLUETOOTH device, it broadcasts a BLUETOOTH advertisement at block 64.

The SCP is defined by an assigning authority in the server/cloud 11. The server/cloud 11 sends the SCP definition and any other required data in datasets to the CVD 135 and the mobile device 110. The CVD 135 adds the contextual data from local datasets to the sever-sent data to compile its SCP based definition. The local datasets include data wirelessly scanned from passive devices, preferably transmitting a BLUETOOTH beacon. Other local datasets include information from the vehicle. The CVD 135 sends its compiled SCP packet to the server 11 for authorization. The server 11 verifies the CVD compiled SCP packet, and if valid, the server 11 transmits a validation/approval signal to the CVD 135. The CVD then generates an access point SSID/passphrase with SCP. Likewise, the mobile device 110 utilizes contextual data from local datasets to compile its SCP based on the definitions. The mobile device 110 connects to the access point of the CVD 135 using the SCP. The CVD 135 and the mobile device 110 also connect to the passive device 61 since it is part of the SCP definition.

As used by the assigning authority engine 1105, a predetermined work assignment is a temporal event with a fixed start and completion based on assignable boundary conditions. The assignable boundary condition is at least one of a predetermined time period, a geographical destination, and a set route. Alternatively, the assignable boundary condition is any feature with a beginning and a termination. The assigning authority is performed by a person or persons, who have the appropriate authority and mechanisms to assign specific tasks and assets to a specific vehicle and vehicle operator or custodian, and to assign workflow assignments to same. The predetermined work assignment is assigned to a known person or entity that has its own primary networked device accessible through a password protected user interface, a specific name and password that auto-populates or otherwise automatically satisfies a plurality of credentials requirements, wherein the plurality of credential requirements are automatically available or revoked based on the assignable boundary condition identified in a pairing event.

The CVD 135 preferably broadcasts a WiFi wireless network with a hidden and hashed SSID unique to the host vehicle and protected by a unique, dynamically generated and hashed passphrase. The vehicle ID is entered into an application on the tablet that is then converted to the same hashed SSID and passphrase, which allows the tablet to attempt to connect to the corresponding CVD 135 WiFi network and begin communication.

Figure 7:
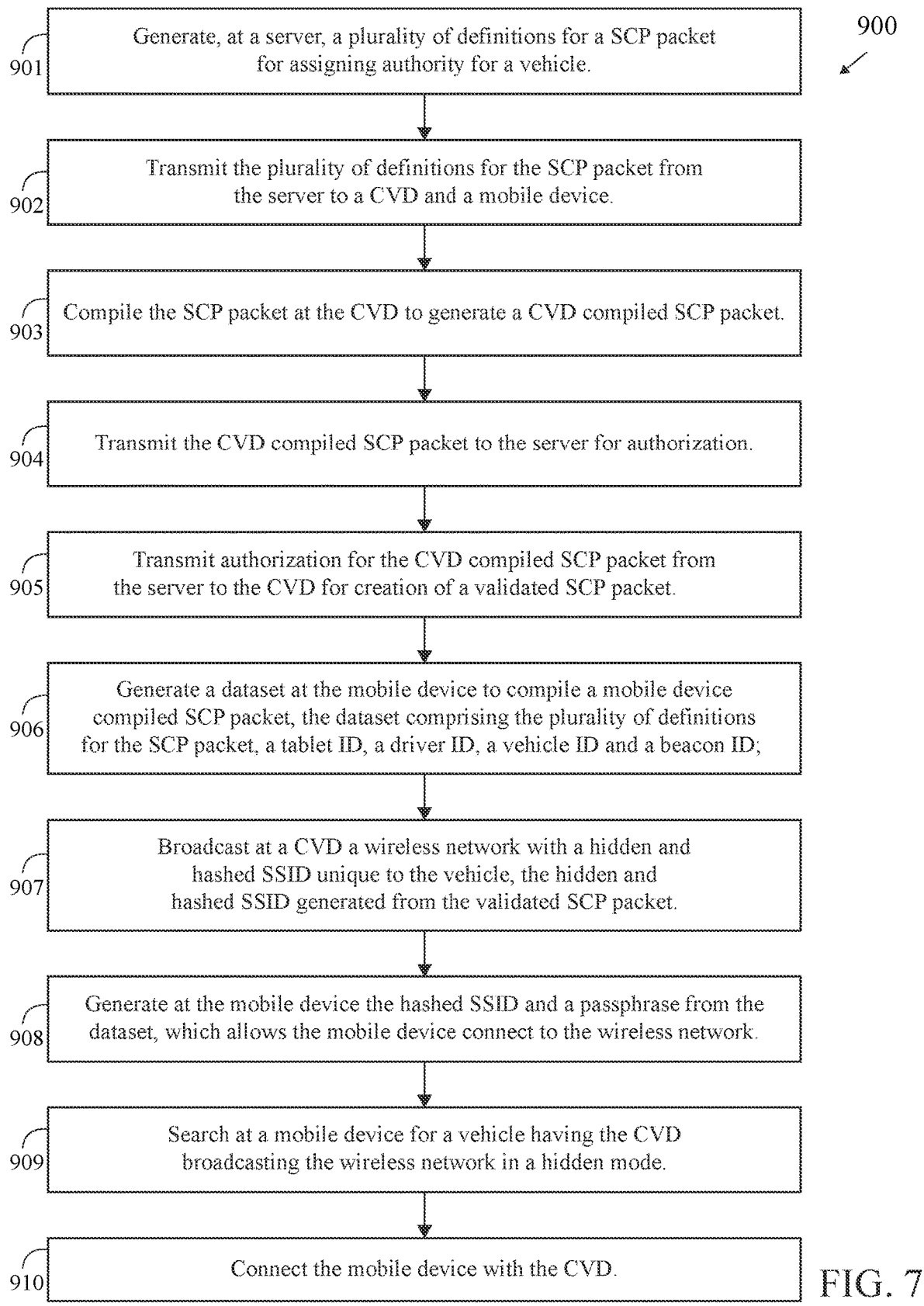
FIG. 7 is a flow chart of a method for a secure connection to a wireless network of a vehicle.

A method 900 for a secure connection to a wireless network of a vehicle is shown in FIG. 7. At block 901, a server generates definitions for a SCP packet for assigning authority for a vehicle. At block 902 the server transmits the definitions for the SCP packet to a CVD and a mobile device. At block 903, the CVD compiles the SCP packet to generate a CVD compiled SCP. At block 904, the CVD transmits the CVD compiled SCP to the server for authorization. At block 905, the server transmits authorization for the CVD compiled SCP from to the CVD for creation of a validated SCP. At block 906, the mobile device generates a dataset to compile a mobile device compiled SCP. At block 907, the CVD broadcasts at a wireless network with a hidden and hashed SSID unique to the vehicle. The hidden and hashed SSID is generated from the validated SCP packet. At block 908, the mobile device generates the hashed SSID and a passphrase from the dataset, which allows the mobile device connect to the wireless network. At block 909, the mobile device searches for a vehicle having the CVD broadcasting the wireless network in a hidden mode. At block 910, the mobile device securely connects with the CVD.

One embodiment utilizes a system for vehicle to mobile device secure wireless communications. The system comprises a vehicle 1000, a CVD 135, a mobile device 110 and a passive communication device 61. The vehicle 1000 comprises an on-board computer with a memory having a vehicle identification number (VIN), a connector plug, and a motorized engine. The CVD 135 comprises a processor, a WiFi radio, a BLUETOOTH radio, a memory, and a connector for mating with the connector plug of the vehicle. The mobile device 110 comprises a graphical user interface, a mobile application, a processor, a WiFi radio, and a cellular network interface. The passive communication device 61 operates on a BLUETOOTH communication protocol. The server 11 is configured to generate a plurality of definitions for a SCP packet for assigning authority for the vehicle. The server 11 is configured to transmit the plurality of definitions for the SCP packet from the server to the CVD 135 and the mobile device 110. The CVD 135 is configured to compile the SCP packet to generate a CVD compiled SCP. The CVD 135 is configured to transmit the CVD compiled SCP to the server 11 for authorization. The server 11 is configured to transmit authorization for the CVD compiled SCP to the CVD 135 for creation of a validated SCP. The mobile device 110 is configured to generating a dataset to compile a mobile device compiled SCP. The CVD 135 is configured to broadcast a wireless network with a hidden and hashed SSID unique to the vehicle, the hidden and hashed SSID generated from the validated SCP packet. The mobile device 110 is configured to generate the hashed SSID and a passphrase from the dataset, which allows the mobile device connect to the wireless network. The mobile device 110 is configured to search for a vehicle having the CVD broadcasting the wireless network in a hidden mode. The mobile device 110 is configured to connect to the CVD 135 over the wireless network.

The dataset preferably comprises at least one of a plurality of definitions for the SCP packet, a tablet ID, a driver ID, a vehicle ID, a beacon ID, identified or defined entity/participant to the transaction, descriptions, actions, or states of thing, characteristics of identifiable devices, when present in a certain proximity and/or context.

Optionally, the mobile device 110 connects to a passive device, the passive device operating on a BLUETOOTH communication protocol. The passive device 61 is preferably a BLUETOOTH enabled device advertising a unique ID as a beacon or a complex system (speaker, computer, etc.) that emits BLUETOOTH enabled device advertising a unique ID as a beacon.

The mobile device 110 preferably receives input from a driver of the vehicle, and/or the server 11 contains the assigning authority that generates the SCP definitions.

The passive device 61 is preferably an internal device in the vehicle or an external device posted on a gate to a facility and generating a beacon. The beacon from the passive device is preferably a mechanism to ensure that the connection between the mobile device 110 and the CVD 135 occurs at a specific physical location dictated by the assigning authority through the server 11. Preferably, the automatic connection between the mobile device 110 and the CVD 135 occurs because the assigning authority, through the server, has dictated that it occur.

Figure 8:
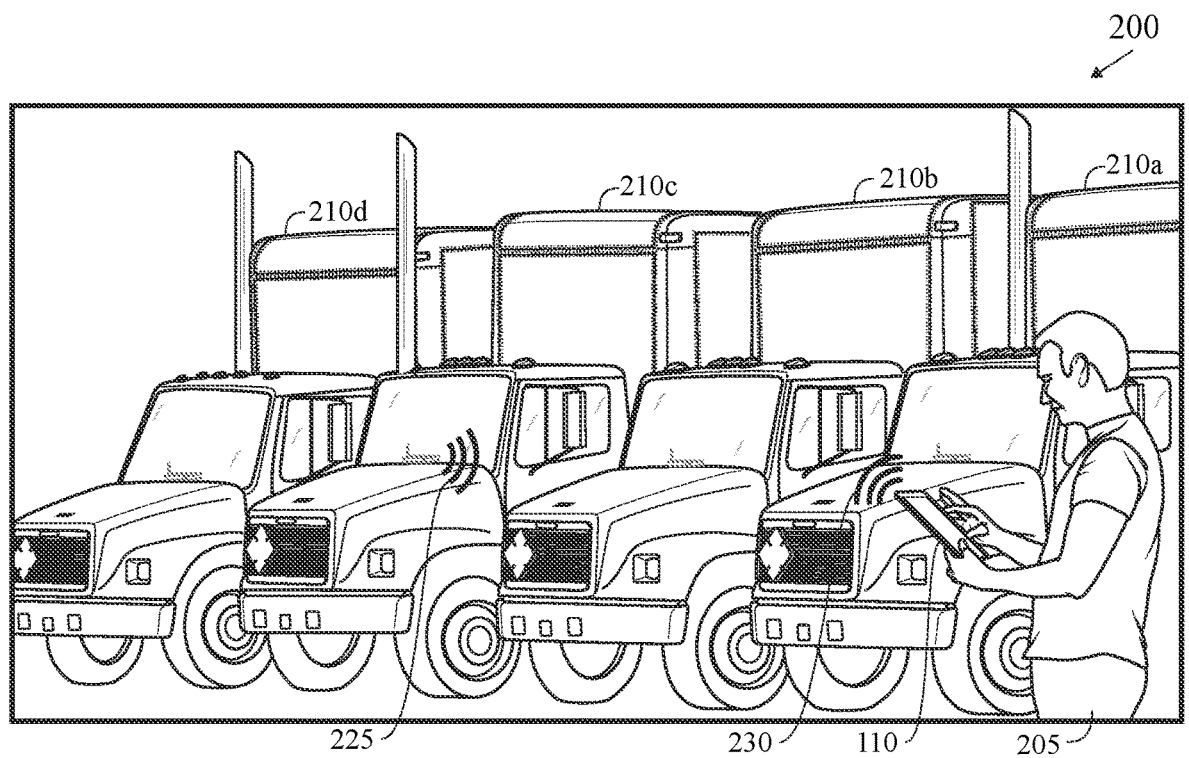
FIG. 8 is an illustration of a driver identifying a vehicle through connection of a tablet computer to an unpublished network.

As shown in FIG. 8, a staging yard 200 for trucks 210a-201d, each of a multitude of trucks 210a-210d broadcast a wireless signal for a truck specific network, with one truck 210c broadcasting a wireless signal 225. However, the SSID is not published, so unless a driver 205 is already in possession of the SSID, the driver 205 will not be able to pair the tablet computer 110 with the CVD 135 of the truck 210 to which the driver 205 is assigned. So even though the wireless signals are being "broadcast", they will not appear on a driver's tablet computer 110 (or other mobile device) unless the tablet computer 110 has already been paired with the CVD 135 of the vehicle 210. A driver 205 in possession of a tablet computer 110 pairs, using a signal 230, the tablet computer 110 with the wireless network 225 of the CVD of the truck 210c, and thus the driver locates the specific truck 210c he is assigned to in a parking lot full of identical looking trucks 210a-d.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

The mobile communication device 110, or mobile device, is preferably selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

The mobile communication device 110 then a communication network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 61 and/or primary device 110 is capable of receiving and transmitting signals using BLUETOOTH™ technology. LTE Frequency Bands include 698-798 MHz (Band 12, 13, 14, 17); 791-960 MHz (Band 5, 6, 8, 18,19,20); 1710-2170 MHz (Band 1, 2, 3, 4, 9, 10, 23, 25, 33, 34, 35, 36, 37, 39); 1427-1660.5MH (Band 11, 21, 24); 2300-2700 MHZ (Band 7, 38, 40, 41); 3400-3800 MHZ (Band 22, 42, 43), and in a preferred embodiment the secondary device 61 and/or the primary device 110 is capable of receiving and transmitting signals using one or more of the LTE frequency bands. WiFi preferably operates using 802.11a, 802.11b, 802.11 g, 802.11n communication formats as set for the by the IEEE, and in in a preferred embodiment the secondary device 61 and/or the primary device 110 is capable of receiving and transmitting signals using one or more of the 802.11 communication formats. Near-field communications (NFC) may also be utilized.

Figure 9:
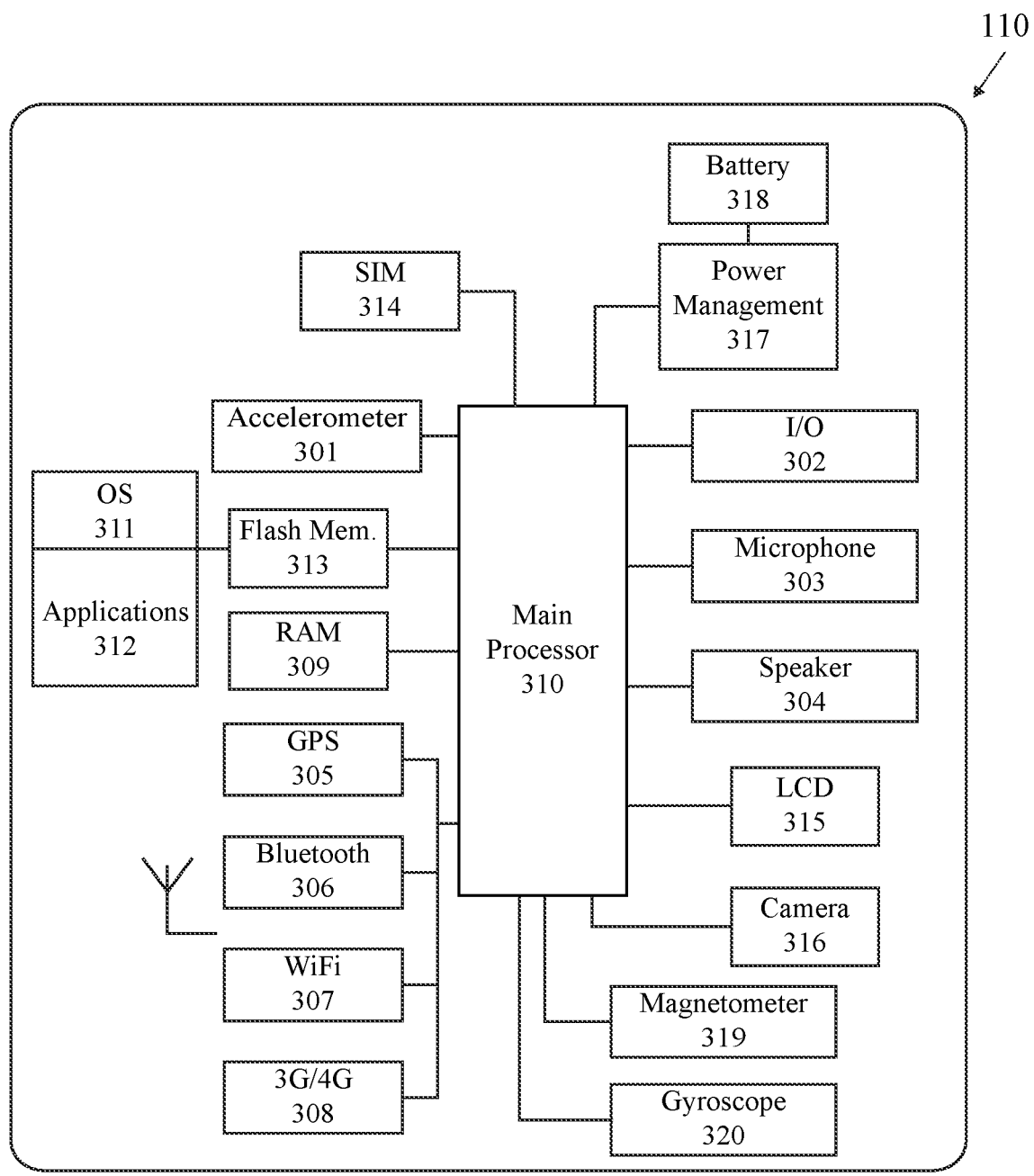
FIG. 9 is an isolated view of general electrical components of a mobile communication device.

As shown in FIG. 9, a typical mobile communication device 110 preferably includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, SFTP, SCP, RSync, Web Services, WAP, SMTP, SMPP, DTS, Stored Procedures, Import/Export, Global Positioning Triangulation, IM, SMS, MMS, GPRS, WebDAP, and Flash. Databases that may be used with the system preferably include but are not limited to MSSQL, Access, MySQL, Progress, Oracle, DB2, Redis, MongoDB, Amazon Aurora, Amazon Redshift, Amazon RDS, Amazon DynamoDB, Apache Hadoop, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at the cloud server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 10:
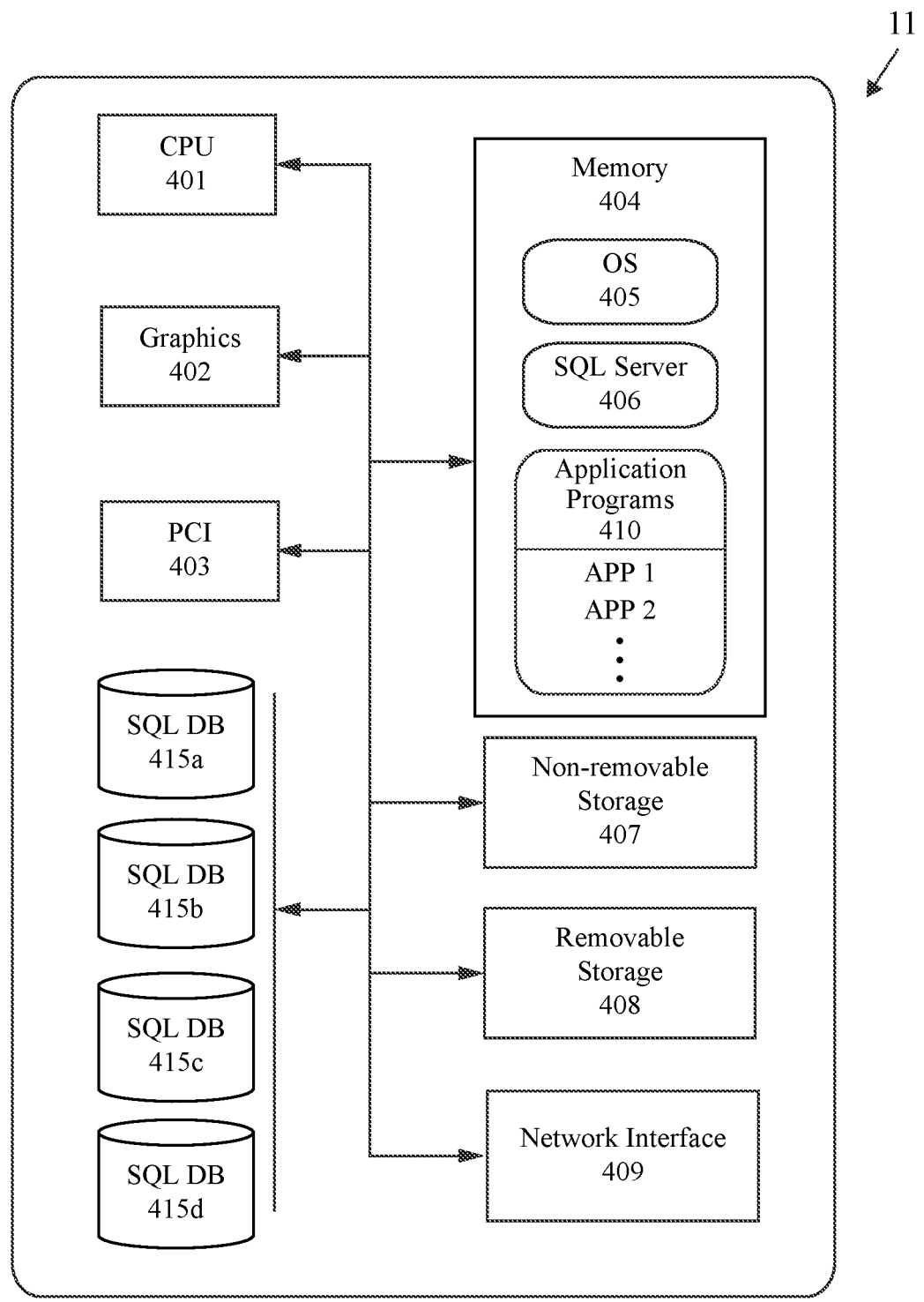
FIG. 10 is an isolated view of general electrical components of a server.

Components of a cloud computing server 11 of the system, as shown in FIG. 10, preferably includes a CPU component 401, a graphics component 402, PCI/PCI Express 403, memory 404, non-removable storage 407, removable storage 408, Network Interface 409, including one or more connections to a fixed network, and SQL database(s) 415a-415d, which includes the venue's CRM. Included in the memory 404, is an operating system 405, a SQL server 406 or other database engine, and computer programs/software 410. The server 11 also preferably includes at least one computer program configured to receive data uploads and store the data uploads in the SQL database. Alternatively, the SQL server 406 can be installed in a separate server from the server 11.

Cloud service providers optionally used in the present invention include Amazon Web Services (AWS), Google Compute Engine (GCE), Microsoft Azure, Digital Ocean, CloudFlare, Akamai, IBM Cloud, Oracle Cloud Infrastructure, and similar.

Figure 11:
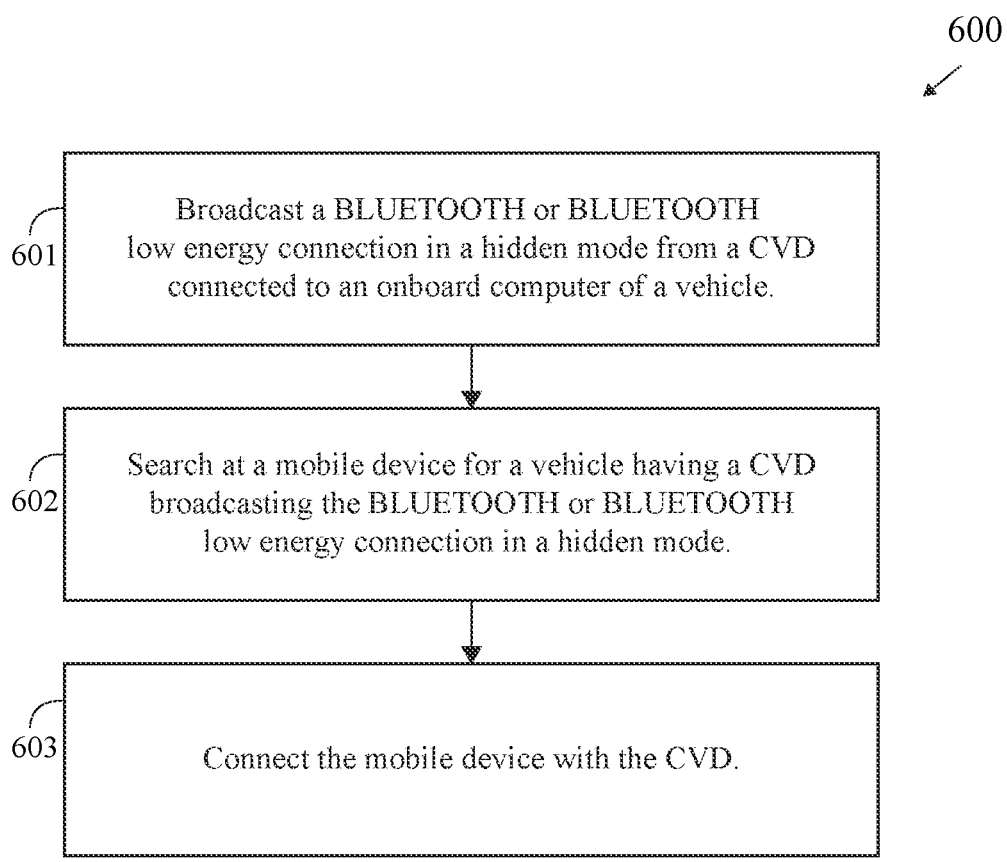
FIG. 11 is a flow chart of a method for securely connecting a wireless device to a single access point in a vehicle.

A flow chart for an alternative method 600 for a secure connection to a wireless network of a vehicle is shown in FIG. 11. At block 601, the CVD broadcasts an encrypted, blind SSID based on specific vehicle data. At block 602, leveraging the known vehicle data and the encryption algorithm a mobile device searches for a vehicle having a CVD broadcasting the wireless network. At block 603, the mobile device is connected with the CVD.

Figure 12:
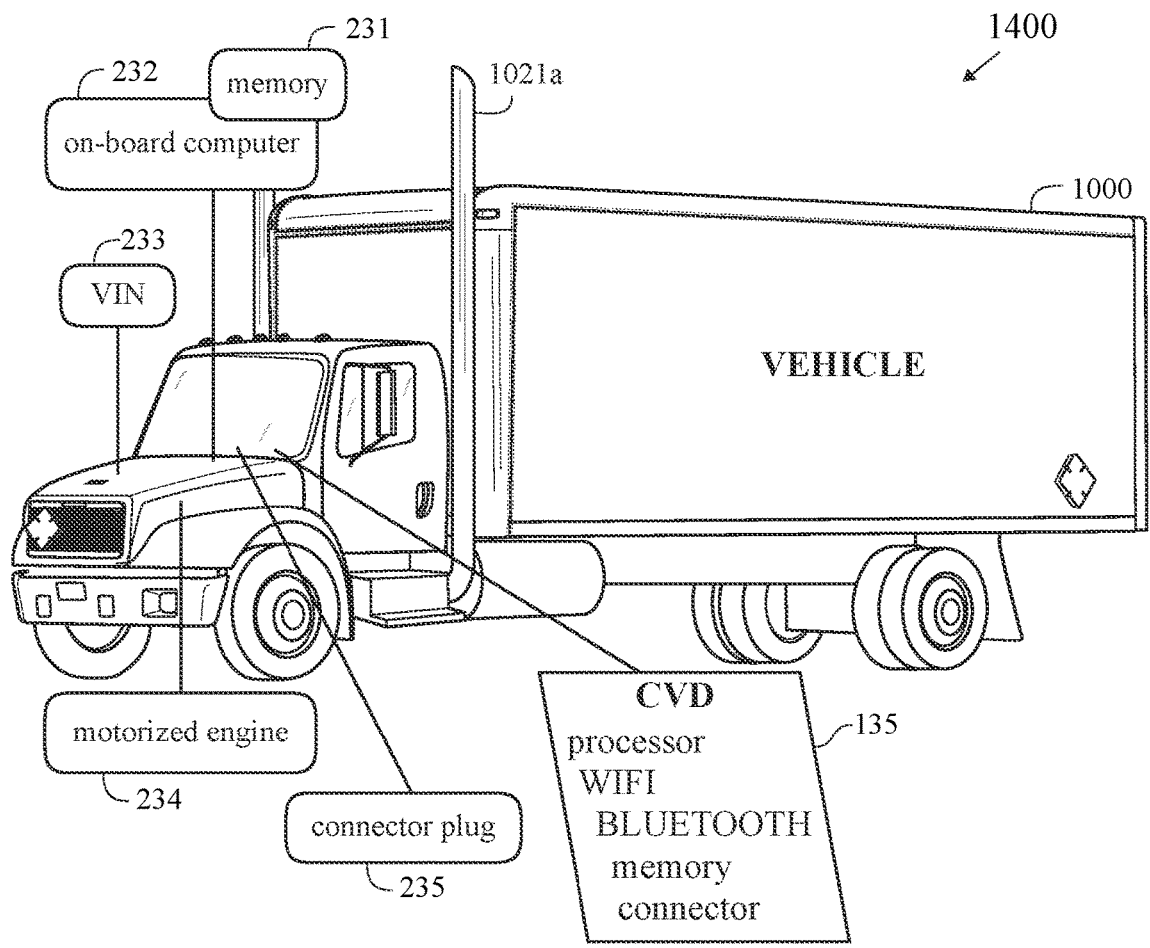
FIG. 12 is an illustration of a system for securely connecting a wireless device to a single access point in a vehicle.
Figure 12:
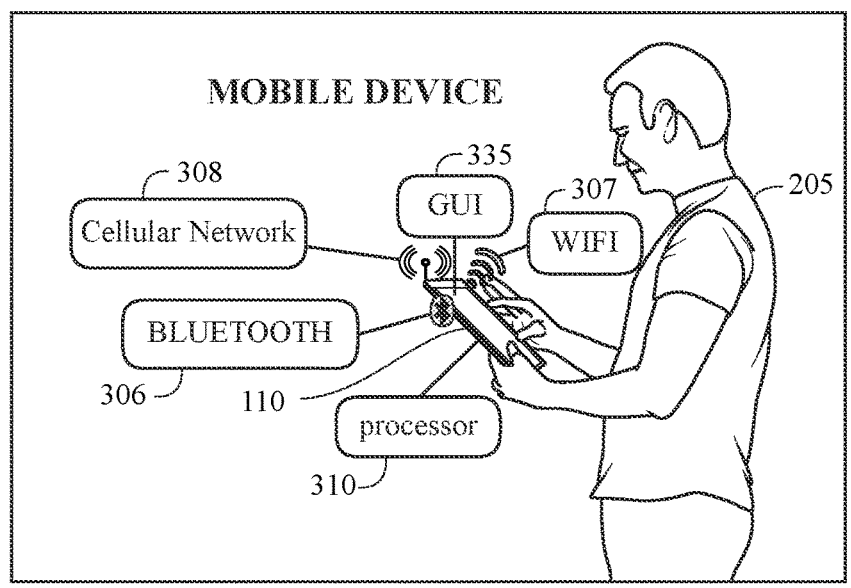

A system 1400 for a secure connection to a wireless network of a vehicle is shown in FIG. 12. The vehicle 1000 shown is a truck. Those skilled in the pertinent art will recognize that the truck may be replaced by any type of vehicle (such as a bus, sedan, pick-up, sport utility vehicle, limousine, sports car, delivery truck, van, mini-van, motorcycle, and the like) without departing from the scope of spirit of the present invention. The truck 1000 preferably comprises a motorized engine 234, a vehicle identification number ("VIN") 233, an on-board computer 232 with a memory 231 and a connector plug 235. The on-board computer 232 preferably has a digital copy of the VIN 233 in the memory 231. The on-board computer 232 is preferably in communication with the motorized engine 234. The truck 1000 may also have a GPS component for location and navigation purposes, a satellite radio such as SIRIUS satellite radio, a driver graphical interface display, a battery, a source of fuel and other components found in a conventional long distance truck.

Also in the truck 1000 is a CVD 135 comprising a processor, a WiFi radio, a BLUETOOTH radio, a memory and a connector to connect to the connector plug of the on-board computer 232.

A driver 205 preferably has a mobile communication device such as a tablet computer 110 in order to pair with a wireless network generated by the CVD 135 of the truck 1000. The tablet computer 110 preferably comprises a graphical user interface 335, a processor 310, a WiFi radio 307, a BLUETOOTH radio 306, and a cellular network interface 308.

Figure 13:
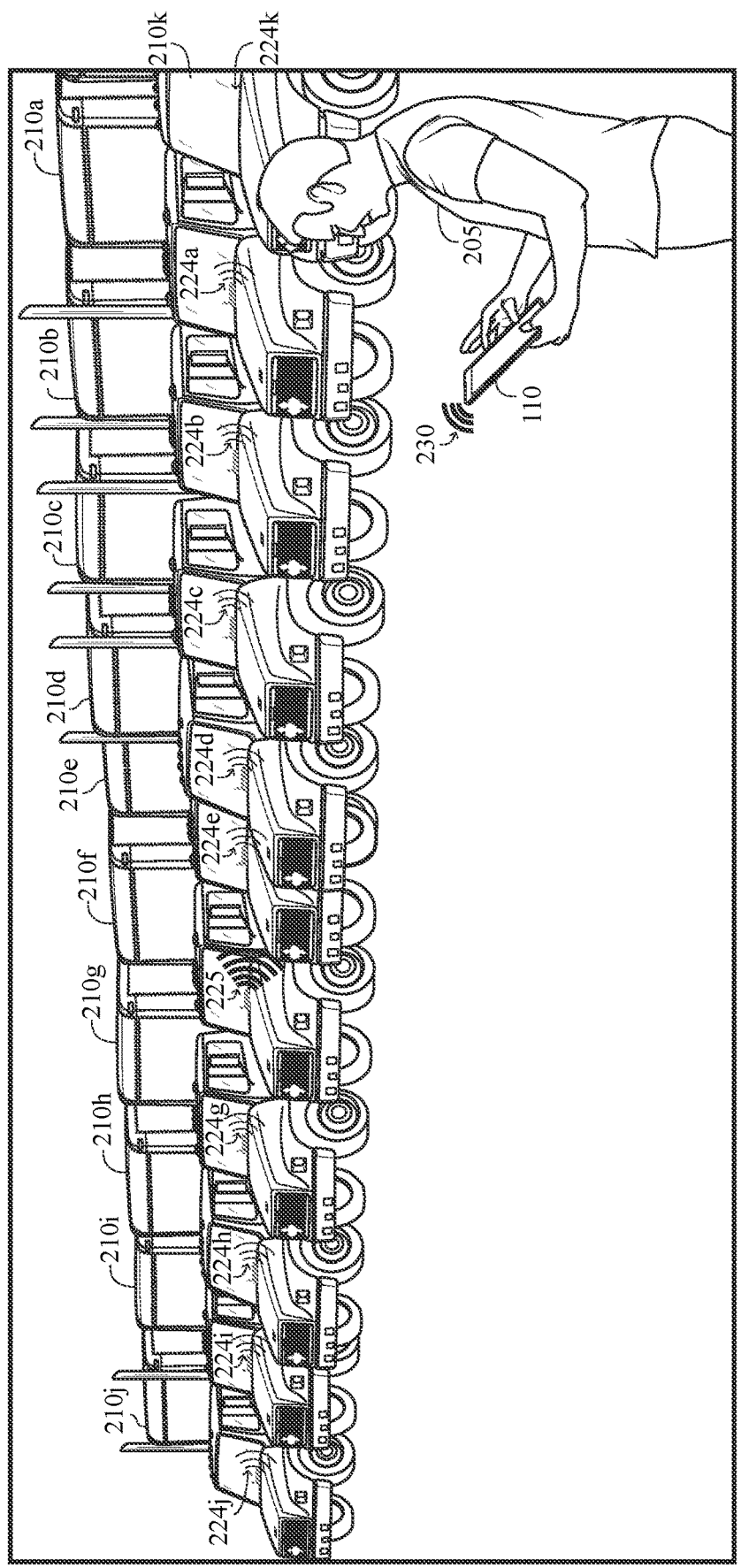
FIG. 13 is an illustration of a driver identifying a vehicle through connection of a tablet computer to an unpublished network.

As shown in FIG. 13, a staging yard for trucks 210a-210k, each of a multitude of trucks 210a-210k broadcast a wireless signal 224a-k for a truck specific network, with one truck 210f broadcasting a wireless signal 225. However, all of the wireless signal 224a-224k and 225 do not publish their respective SSID so that a mobile device 110 must already be paired with the CVD 135 of the truck 210 in order to connect to the truck based wireless network 224a-224k or 225 of each of the CVDs 135 of each of the trucks 210a-210k. A driver 205 in possession of a tablet computer 110 pairs with the specific truck wireless network 225 of the CVD 135 of the truck 210f, and thus the driver locates the specific truck 210f he is assigned to in a parking lot full of identical looking trucks 210a-210k.

In one embodiment, the system for monitoring and minimizing vehicle carbon emissions utilizes the remote profile manager for vehicle dynamic compliance with multiple vehicle statutes and regulations. The system comprises a truck 1000, a CVD 135, a tablet computer 110, a server 11 and a plurality of databases. The vehicle comprises an on-board computer with a memory having a vehicle identification number (VIN), a connector plug, and a motorized engine. The CVD 135 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. A location of the truck 1000 is determined using a GPS component of the truck 1000. The location of the truck 1000 is transmitted to the server 11 by the CVD 135. The server 11 retrieves real-time compliance rules for the location of the truck from the plurality of databases, which are preferably State vehicle databases, municipal vehicle databases, county vehicle databases, and Federal vehicle databases. The server 11 transmits the real-time compliance rules to the CVD 135 for display on the tablet computer 110 so that a driver 205 of the truck 1000 can stay in real-time compliance with State and Federal motor vehicle and driving rules. The rules pertain to speed limits, transport of toxic waste, the transport of refrigerated cargo, the rest durations for drivers, the necessary insurance coverage, the type of taxes and fees to be paid, and the like. The display on the tablet computer is preferably in the form of a visual alert, an audio alert or a haptic alert. Other displays include forms such as attestation forms, and data such as timers, current speed limits, and the like. The trigger for each jurisdiction is preferably from the GPS of the truck 1000, the speed of the truck 1000, cellular or WiFi triangulation from a network, and the like.

The CVD 135 obtains the vehicle identification number (VIN) 233 from the on-board computer and transmits the VIN 233 with the location to the server 11 for verification of the truck 1000.

In another embodiment, the system for monitoring and minimizing vehicle carbon emissions utilizes the remote profile manager for utilizing multiple vehicle odometer values. The system comprises a vehicle 1000, a CVD 135, a tablet computer 110, a server 11 and a plurality of databases 1125. The vehicle comprises an on-board computer with a memory having a vehicle identification number (VIN), a connector plug, a motorized engine, an odometer component from an engine source, an odometer component from a dashboard source, an odometer component from a chassis source, and an odometer component from a transmission source. Thus, the truck 1000 has a multiple of odometers that can be used to determine a mileage of the truck 1000. The connected vehicle device (CVD) 135 comprises a processor, a WiFi radio, a BLUETOOTH radio, a memory, and a connector for mating with the connector plug of the vehicle. The tablet computer 110 comprises a graphical user interface, a processor, a WiFi radio, a BLUETOOTH radio, and a cellular network interface. Each of the odometer component from an engine source, the odometer component from a dashboard source, the odometer component from a chassis source, and the odometer component from a transmission source generates an odometer value. The CVD 135 generates a delta value for odometer value relative to a control odometer value. The CVD 135 monitors the odometer value from each of the odometer component from an engine source, the odometer component from a dashboard source, the odometer component from a chassis source, and the odometer component from a transmission source. The CVD 135 generates a new odometer value for one of the odometer component from an engine source, the odometer component from a dashboard source, the odometer component from a chassis source, and the odometer component from a transmission source, and the CVD 135 modifies the odometer value by the delta value to generate the new odometer value.

Figure 14:
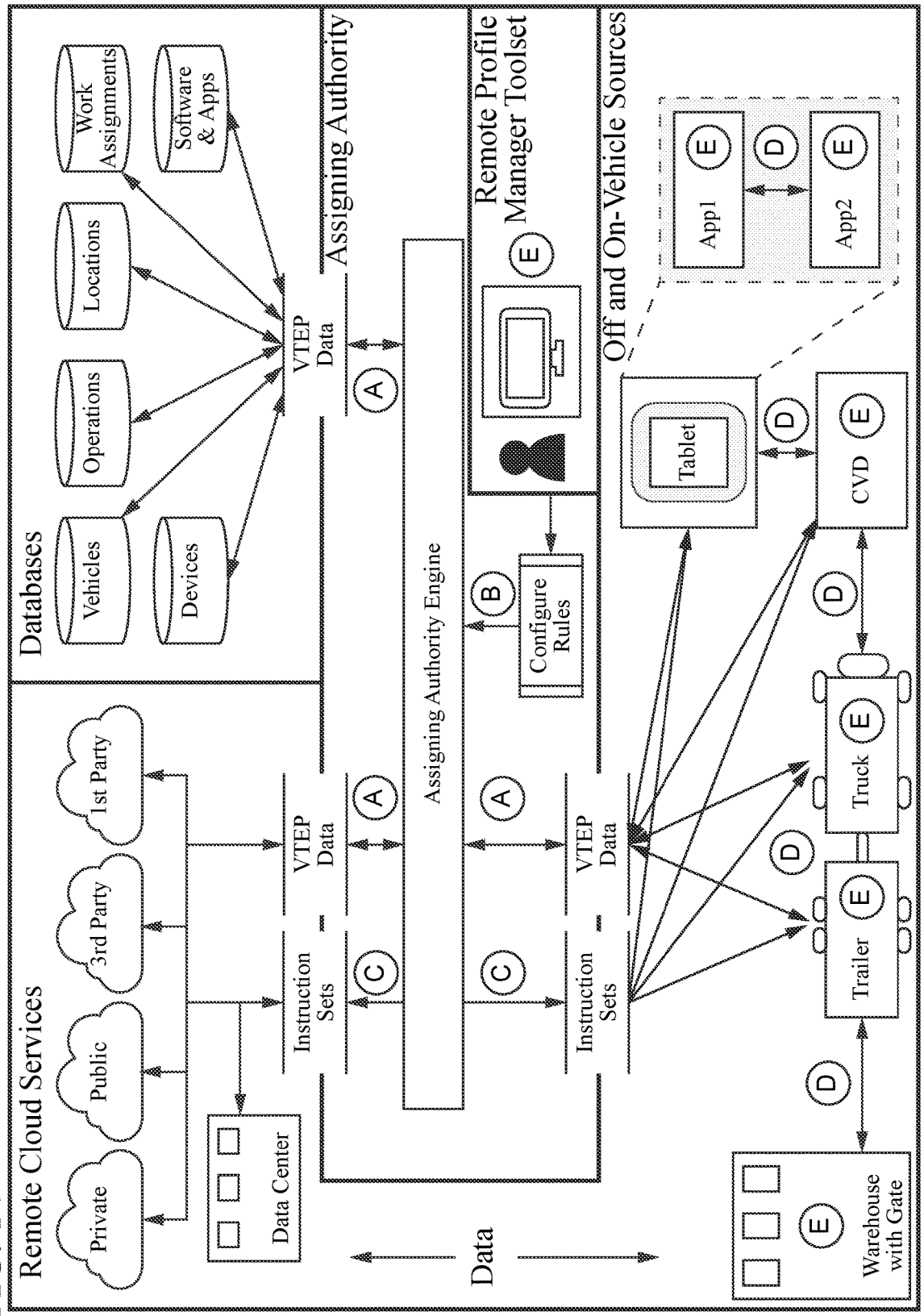
FIG. 14 is a block diagram of a system for remote profile management for utilizing data and computational information from on-vehicle and off-vehicle sources.

FIG. 14 is a block diagram of a system 1500 for remote profile management for utilizing data and computational information from on-vehicle and off-vehicle sources for monitoring and minimizing vehicle carbon emissions for a vehicle. At step A, VTEP data is gathered from multiple databases, cloud services and other off-vehicle sources, as well as on-vehicle sources. At step B, the RPM toolset is used to configure multiple assigning authority rules based on the collected VTEP data. At step C, multiple instruction sets are delivered to multiple cloud services, other off-vehicle sources and on-vehicle sources. At step D, off-vehicle sources such as physical infrastructure, vehicles, mobile devices, and mobile device applications share data per the delivered instruction sets. At step E, back office managers, physical infrastructure, on-vehicle and off-vehicle sources are provided with new information data set combinations enabling novel processing capabilities for the system.

In one embodiment, the off-vehicle source is a mobile application operating on a mobile device, and the data originates from the mobile application.

In another embodiment, app to app integration is utilized to generate the information data set. The app to app integration is performed at a remote server, within an app on a mobile device, on a CVD or a combination thereof.

The cloud sources preferably comprise a public cloud source, a private cloud source, a hybrid cloud source, a multi-cloud source, a service provider cloud, a telematics service provider cloud, an original equipment manufacturer cloud (truck manufacturer, Tier 1 supplier, device supplier and the like), a customer cloud (end user) and/or a public cloud.

The system also preferably includes physical infrastructures with communication devices comprising at least one of a building, a gate, an access controlled point of entry, a parking structure, a weigh station, a toll collection structure, a fueling equipment and a vehicle service equipment. In one embodiment, a passive device on a physical structure broadcasts a unique ID which is received by a mobile device and a vehicle gateway device. In one embodiment, the passive device is a BLUETOOTH that broadcasts a BLUETOOTH advertisement.

Multiple vehicle connected mobility devices are preferably used with the system 1500 and comprise at least one of a tablet computer, a mobile phone, a scanning device, a beacon, a RF passive or active communication device and a signature capture device.

Affiliates with the system 1500 include at least one of another vehicle authorized to share data via vehicle-to-vehicle (V2V), Cloud, or other RF communication protocols, a TMS system authorized by the assigning authority engine 1105 to directly take data from or provide data to the vehicle CVD 135, an authorized cloud provider, and an authorized user granted access by the assigning authority.

The vehicle 1000 is preferably one of a long-haul semi-truck, a bus, a sedan, a pick-up, a sports utility vehicle, a limousine, a sports car, a delivery truck, a van, or a mini-van.

Figure 15:
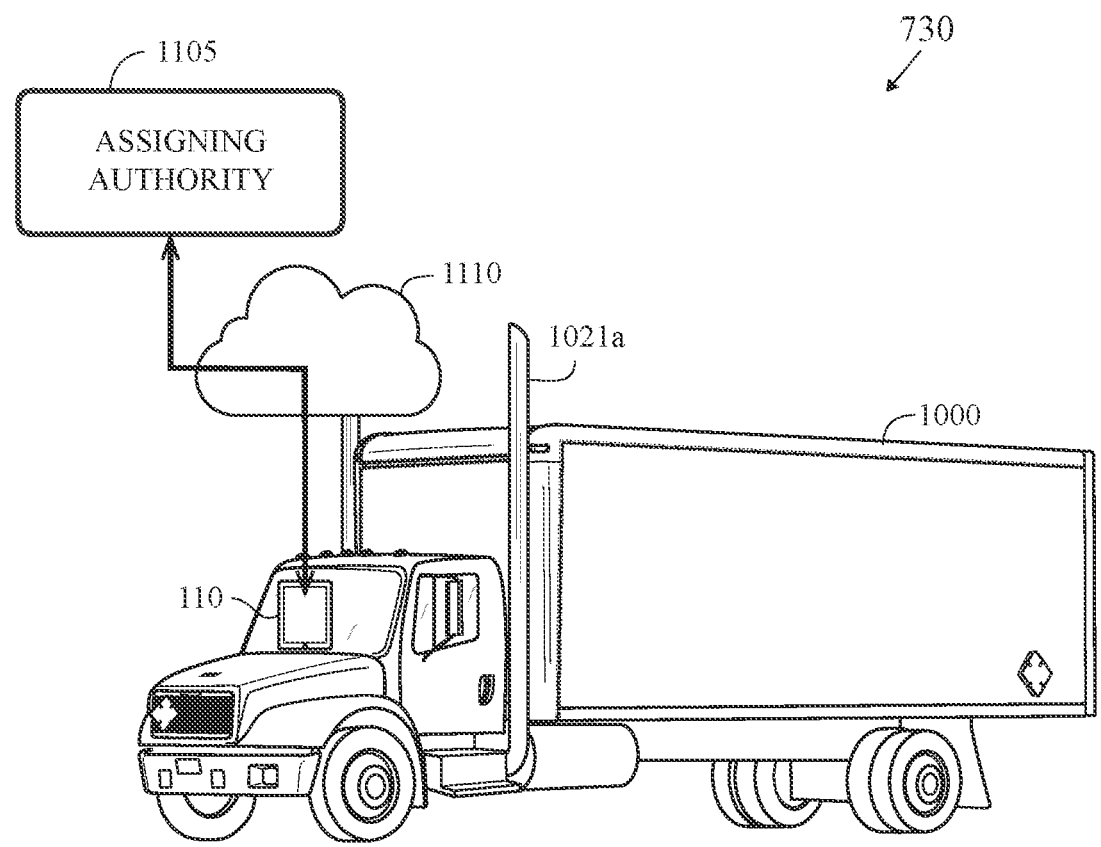
FIG. 15 is a block diagram of a system for enabling a vehicle utilizing electrical propulsion to selectively commence a re-charging session.

FIG. 15 is a block diagram of a system 730 for monitoring and minimizing vehicle carbon emissions, for a known vehicle 1000 connected through a secure mobile network, based on one or more variables determined by an assigning authority 1105 that is connected to the vehicle through a communications network 1110.

Figure 16:
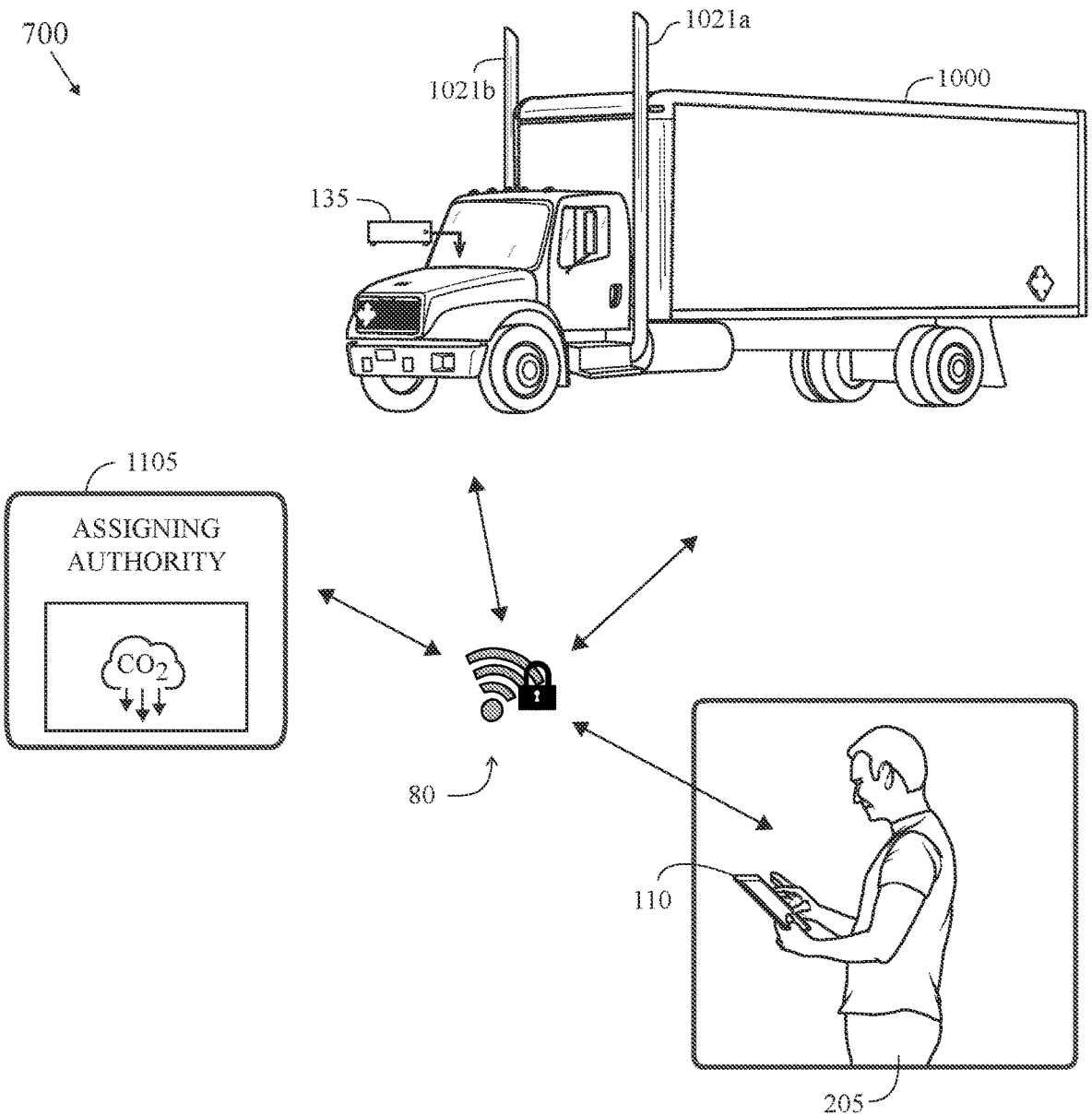
FIG. 16 is a block diagram of a system for determining the parameters of a charging session for an electric vehicle.

FIG. 16 is a block diagram of a system 700 for monitoring and minimizing vehicle carbon emissions, for a known vehicle 1000 connected through a secure mobile network 80. The system 700 includes a vehicle 1000, a mobile communication device 110, and an assigning authority engine 1105. The assigning authority engine 1105 is preferably in communication with the mobile communication device 110. Further, the assigning authority engine 1105 is configured to enable, disable or manage the at least one function of the mobile device over a secure wireless network 80 based on data relating to carbon emissions, and to adapt to a present environment based on data relating to carbon emissions from the RPM.

Figure 17:
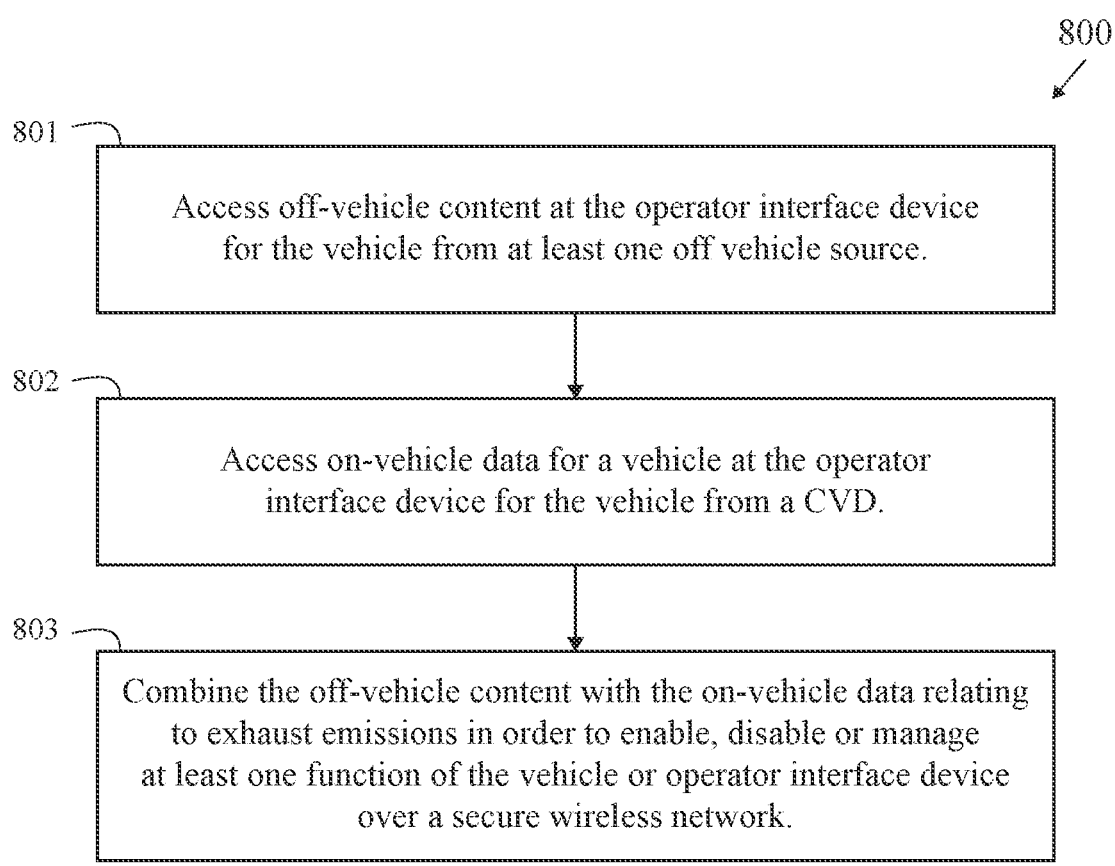
FIG. 17 is a flow chart of a method for controlling a function of an operator interface device over a secure wireless network for monitoring and minimizing vehicle exhaust emissions.

FIG. 17 is a flow chart 800 for a method for controlling a function of an operator interface device over a secure wireless network for monitoring and minimizing vehicle exhaust emissions. The method comprises of step 801, accessing, from at least one off-vehicle source, off-vehicle content at the operator interface device for the vehicle. Step 802 is accessing, from a connected vehicle device (CVD), on-vehicle data for a vehicle at the operator interface device for the vehicle. Step 803 is combining the off-vehicle content with the on-vehicle data relating to exhaust emissions in order to enable, disable or manage at least one function of the vehicle or operator interface device over a secure wireless network. The at least one off-vehicle source is selected from a group comprising at least one database, at least one cloud source, or at least one physical structure with a communication device. The operator interface device is preferably a mobile communication device.

Figure 18:
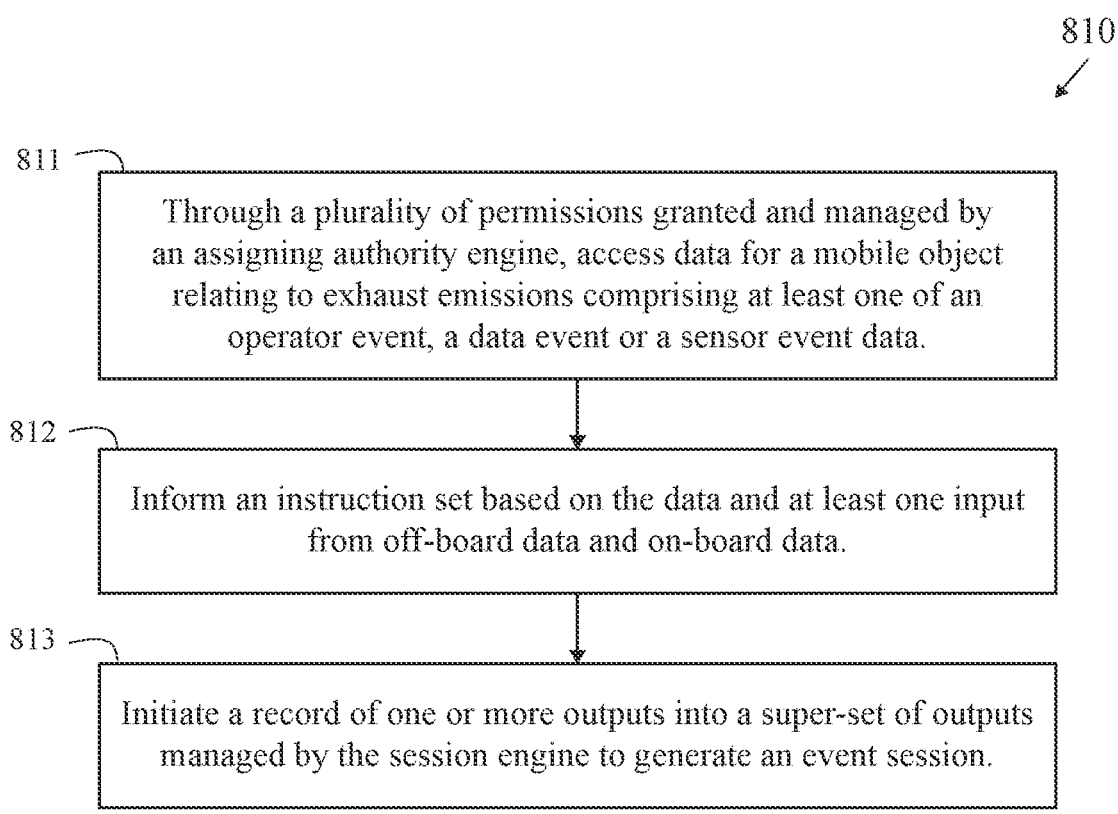
FIG. 18 is a flow chart of a method for monitoring and minimizing exhaust emissions, for a known mobile object connected through a secure mobile network.

FIG. 18 is a flow chart 810 for a method for monitoring and minimizing exhaust emissions, for a known mobile object connected through a secure mobile network. Step 811 is accessing, through a plurality of permissions granted and managed by an assigning authority engine, data for a mobile object relating to exhaust emissions comprising at least one of an operator event, a data event or a sensor event data. Step 812 is informing an instruction set based on the data and at least one input from off-board data and on-board data, wherein the instruction set creates an output, wherein the output is sequenced and associated with a single common time signature by a session engine. Step 813 is initiating a record of one or more outputs into a super-set of outputs managed by the session engine to generate an event session, wherein each output of the super-set of outputs is associated with a same single common time signature and event. The event session provides a record of the total outputs created from at least one data stream of the mobile object comprising data relating to carbon emissions collected within a defined period of time.

The data comprises at least one of speeds/acceleration, operating modes, vehicle-miles traveled, starts and idling, temperatures, average gasoline fuel properties, type of fuel used, the amount of fuel consumed, gear position, fuel level, engine rotations per minute, location, or drive status.

The mobile object comprises at least one on-board sensor to measure exhaust emissions from the mobile object.

An operating system controls the execution of other computer programs, running of the PSO platform, and provides scheduling, input-output control, file and data management, memory management, and communication control and related services. The operating system may be, for example Windows (available from Microsoft, Corp. of Redmond, Wash.), LINUX or other UNIX variants (available from Red Hat of Raleigh, N.C. and various other vendors), Android and variants thereof (available from Google, Inc. of Mountain View, Calif.), Apple OS X, iOs and variants thereof (available from Apple, Inc. of Cupertino, Calif.), or the like.

The system and method described in connection with the embodiments disclosed herein is preferably embodied directly in hardware, in a software module executed by a processor, or in a combination of the two. A software module preferably resides in flash memory, ROM memory, EPROM memory, EEPROM memory, RAM memory, registers, a hard disk, a removable disk, a CD-ROM, or any other form of storage medium known in the art. An exemplary storage medium is preferably coupled to the processor, so that the processor reads information from, and writes information to, the storage medium. In the alternative, the storage medium is integral to the processor. In additional embodiments, the processor and the storage medium reside in an Application Specific Integrated Circuit (ASIC). In additional embodiments, the processor and the storage medium reside as discrete components in a computing device. In additional embodiments, the events and/or actions of a method reside as one or any combination or set of codes and/or instructions on a machine-readable medium and/or computer-readable medium, which are incorporated into a computer software program.

In additional embodiments, the functions described are implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium is any available media that is accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection is termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and BLU-RAY disc where disks usually reproduce data magnetically, while discs usually reproduce data optically with lasers. Combinations of the above should also be included within the scope of computer-readable medium.

A computer program code for carrying out operations of the Present Invention is preferably written in an object oriented, scripted or unscripted programming language such as C++, C#, SQL, Java, Python, Javascript, Typescript, PHP, Ruby, or the like.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS"), or other similar protocols. The protocol at the server is preferably HTTPS.

Components of a server includes a CPU component, a graphics component, memory, non-removable storage, removable storage, Network Interface, including one or more connections to a fixed network, and SQL database(s). Included in the memory, is an operating system, a SQL server or other database engine, and computer programs/software.

Kennedy et al., U.S. patent application Ser. No. 16/912,265, filed on Jun. 25, 2020 for a Method And System For Generating Fueling Instructions For A Vehicle, is hereby incorporated by reference in its entirety.

Kennedy et al., U.S. Pat. No. 10,652,935 for Secure Wireless Networks For Vehicles, is hereby incorporated by reference in its entirety.

Kennedy et al., U.S. patent application Ser. No. 16/870,955, filed on May 9, 2020 for Secure Wireless Networks For Vehicle Assigning Authority, is hereby incorporated by reference in its entirety.

Kennedy et al., U.S. Pat. No. 10,917,921 for Secure Wireless Networks For Vehicles, is hereby incorporated by reference in its entirety.

Son et al., U.S. Pat. No. 10,475,258 for a Method And System For Utilizing Vehicle Odometer Values And Dynamic Compliance, is hereby incorporated by reference in its entirety.

Son et al., U.S. Pat. No. 10,070,471 for a Secure Wireless Networks For Vehicles, is hereby incorporated by reference in its entirety.

Son et al., U.S. Pat. No. 10,652,935 for a Secure Wireless Networks For Vehicles, is hereby incorporated by reference in its entirety.

Kennedy et al., U.S. patent application Ser. No. 11/197,330 for a Remote Profile Manager For A Vehicle, is hereby incorporated by reference in its entirety.

Kennedy et al., U.S. Pat. No. 11,197,329 for a Method And System For Generating Fueling Instructions For A Vehicle, is hereby incorporated by reference in its entirety.

Kennedy et al., U.S. Pat. No. 11,503,655 for a Micro-Navigation For A Vehicle, is hereby incorporated by reference in its entirety.

Kopchinsky et al., U.S. patent application Ser. No. 17/384,768, filed on Jul. 25, 2021, for a Method And System For Dynamic Wireless Connection Management, is hereby incorporated by reference in its entirety.

Fields et al., U.S. patent application Ser. No. 17/486,777, filed on Sep. 27, 2021, for Remote Mobile Device Management, is hereby incorporated by reference in its entirety.

Kennedy et al, U.S. patent application Ser. No. 17/498,689, filed on Oct. 11, 2021, for a Method And System For Synchronizing Events Within A Secure Wireless Network, is hereby incorporated by reference in its entirety.

Kopchinsky et al., U.S. patent application Ser. No. 17/531,285, filed on Nov. 19, 2021, for a Method And System For Generating Standardized Format Data From Disparate, Non-Standardized Vehicle Data, is hereby incorporated by reference in its entirety.

Abella et al., U.S. patent application Ser. No. 17/718,215, filed on Apr. 11, 2022, for a Method And System To Identify And Mitigate Problematic Devices, is hereby incorporated by reference in its entirety.

Kennedy et al., U.S. patent application Ser. No. 17/697,896, filed on Mar. 17, 2022, for an Assigning Authority For Electric Vehicle Charging is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system for monitoring and minimizing vehicle exhaust emissions, for a known vehicle connected through a secure wireless network, the system comprising:
    a connected vehicle device (CVD) comprising on-vehicle data for a vehicle;
    at least one off-vehicle source selected from a group comprising at least one database, at least one cloud source, or at least one physical structure with a communication device; and
    wherein the CVD is configured to access and combine off-vehicle content from the at least one off-vehicle source with on-vehicle data relating to vehicle exhaust emissions, to enable, disable or manage at least one function of the vehicle or CVD over a secure wireless network.

2. The system according to claim 1 further comprising an operator interface device comprising a remote profile manager (RPM) toolset, wherein the RPM is configured to execute the plurality of dynamic, temporal combinations to access data relating to vehicle exhaust emissions to inform the plurality of instruction sets, and wherein the RPM is configured to use one or more elements of the data to synchronize on-vehicle data elements or a computational output of the off-vehicle content, to generate a new information data set combination.

3. The system according to claim 2 further comprising an assigning authority, wherein the assigning authority instructs the operator interface device for permitted actions by an operator of the vehicle and/or time frames for the permitted actions.

4. The system according to claim 3 wherein the assigning authority is configured to adapt to a present environment based on data relating to vehicle exhaust emissions from the RPM.

5. The system according to claim 3 wherein the assigning authority is configured to enable, disable or manage the at least one function of the operator interface device over the secure wireless network based on data relating to vehicle exhaust emissions.

6. The system according to claim 5 wherein the on-vehicle data comprises at least one of speeds/acceleration, operating modes, vehicle-miles traveled, starts and idling, temperatures, average gasoline fuel properties, type of fuel used, the amount of fuel consumed, gear position, fuel level, engine rotations per minute, location, or drive status.

7. The system according to claim 1 wherein enabling, disabling, and managing functions comprises at least one application, at least one feature, or at least one widget.

8. The system according to claim 1 wherein the off-vehicle content comprises at least one of weight, altitude, temperature, speed limit, or traffic conditions.

9. The system according to claim 1 wherein the vehicle comprises at least one on-vehicle sensor to measure vehicle exhaust emissions from the vehicle.

10. The system according to claim 1 wherein the CVD is configured to access and combine off-vehicle content with on-vehicle data relating to vehicle exhaust emissions to generate resulting measures, calculations, or user-configured reports to enable, disable, or manage at least one function of an authorized remote terminal.

11. A method for controlling a function of an operator interface device over a secure wireless network for monitoring and minimizing vehicle exhaust emissions, the method comprising:
    accessing, from at least one off vehicle source, off-vehicle content at the operator interface device for the vehicle;
    accessing, from a connected vehicle device (CVD), on-vehicle data for a vehicle at the operator interface device for the vehicle; and
    combining the off-vehicle content with the on-vehicle data relating to exhaust emissions in order to enable, disable or manage at least one function of the vehicle or operator interface device over a secure wireless network;
    wherein the at least one off vehicle source is selected from a group comprising at least one database, at least one cloud source, or at least one physical structure with a communication device.

12. The method according to claim 11 wherein on-vehicle data comprises at least one of speeds/acceleration, operating modes, vehicle-miles traveled, starts and idling, temperatures, average gasoline fuel properties, type of fuel used, the amount of fuel consumed, gear position, fuel level, engine rotations per minute, location, or drive status.

13. The method according to claim 11 wherein the off-vehicle data comprises at least one of weight, altitude, temperature, speed limit, or traffic conditions.

14. The method according to claim 11 wherein the vehicle comprises at least one on-board sensor to measure vehicle exhaust emissions from the vehicle.

15. The method according to claim 11 wherein the operator interface device is a mobile communication device.

16. The method according to claim 11 wherein the CVD is configured to access and combine off-vehicle content with on-vehicle data relating to vehicle exhaust emissions to generate resulting measures, calculations, or user-configured reports to enable, disable, or manage at least one function of an authorized remote terminal.

17. A method for monitoring and minimizing exhaust emissions, for a known mobile object connected through a secure mobile network, the method comprising:
    accessing, through a plurality of permissions granted and managed by an assigning authority engine, data for a mobile object relating to exhaust emissions comprising at least one of an operator event, a data event or a sensor event data;
    informing an instruction set based on the data and at least one input from off-board data and on-board data, wherein the instruction set creates an output, wherein the output is sequenced and associated with a single common time signature by a session engine;
    initiating a record of one or more outputs into a super-set of outputs managed by the session engine to generate an event session, wherein each output of the super-set of outputs is associated with a same single common time signature and event;
    wherein the event session provides a record of the total outputs created from at least one data stream of the mobile object comprising data relating to carbon emissions collected within a defined period of time.

18. The method according to claim 17 wherein the data comprises at least one of speeds/acceleration, operating modes, vehicle-miles traveled, starts and idling, temperatures, average gasoline fuel properties, type of fuel used, the amount of fuel consumed, gear position, fuel level, engine rotations per minute, location, or drive status.

19. The method according to claim 17 wherein the mobile object comprises at least one on-board sensor to measure exhaust emissions from the mobile object.

* * * * *